United States Patent
Asterjadhi et al.

(10) Patent No.: US 10,999,852 B2
(45) Date of Patent: *May 4, 2021

(54) METHODS AND APPARATUS FOR REQUESTING BUFFER STATUS REPORTS FOR IMPLEMENTING MULTIPLE USER UPLINK MEDIUM ACCESS CONTROL PROTOCOLS IN A WIRELESS NETWORK

(71) Applicant: QUALCOMM Incorporated, San Diego, CA (US)

(72) Inventors: Alfred Asterjadhi, San Diego, CA (US); Simone Merlin, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,955

(22) Filed: Dec. 23, 2019

(65) Prior Publication Data

US 2020/0128551 A1 Apr. 23, 2020

Related U.S. Application Data

(63) Continuation of application No. 15/177,267, filed on Jun. 8, 2016, now Pat. No. 10,536,948.
(Continued)

(51) Int. Cl.
*H04W 72/04* (2009.01)
*H04W 72/12* (2009.01)
(Continued)

(52) U.S. Cl.
CPC ... *H04W 72/0486* (2013.01); *H04W 28/0278* (2013.01); *H04W 72/0406* (2013.01); *H04W 72/12* (2013.01); *H04W 74/06* (2013.01)

(58) Field of Classification Search
None
See application file for complete search history.

(56) References Cited

U.S. PATENT DOCUMENTS

2012/0269154 A1* 10/2012 Wang ............... H04W 72/1284
370/329
2013/0089057 A1  4/2013 Worrall et al.
(Continued)

FOREIGN PATENT DOCUMENTS

CN         104254985 A      12/2014
EP         1909442 A2        4/2008
(Continued)

OTHER PUBLICATIONS

Ahn W., "Multi Channel Availability for UL-OFDMA", IEEE 802.11-15/0612r0,IEEE Draft; 11-15-0612-00-00AX-MULTI-CHANNEL-AVAILABILITYFOR-UL-OFDMA, IEEE-SA Mentor, Piscataway, NJ, USA, vol. 802.11 ax, May 11, 2015 (May 11, 2015), XP068094484, pp. 1-16, Internet URL:https://Mentor.ieee.org/802.11/dcn/15/11-15-0612-00-00ax-multi-channel-Availability-for-ul-ofdma.pptx.
(Continued)

*Primary Examiner* — Scott M Sciacca
(74) *Attorney, Agent, or Firm* — Qualcomm Incorporated

(57) ABSTRACT

Methods and apparatus for allocating multi-user communication resources to one or more stations for uplink data transmissions are provided. In one aspect, a method for allocating multi-user communication resources to one or more stations for uplink data transmissions is provided. The method comprises generating a request frame requesting an uplink buffer report from each of the one or more stations, the request frame selectively requesting that the uplink buffer report indicate either an amount of data in an uplink buffer or a requested amount of time to transmit the data in the uplink buffer. The method comprises transmitting the
(Continued)

request frame to each of the one or more stations. The method comprises receiving the uplink buffer report in a report frame from each of the one or more stations.

44 Claims, 12 Drawing Sheets

Related U.S. Application Data

(60) Provisional application No. 62/190,142, filed on Jul. 8, 2015, provisional application No. 62/182,963, filed on Jun. 22, 2015.

(51) Int. Cl.
*H04W 74/04* (2009.01)
*H04W 28/02* (2009.01)
*H04W 74/06* (2009.01)

(56) References Cited

U.S. PATENT DOCUMENTS

| | | |
|---|---|---|
| 2013/0094455 A1 | 4/2013 | Wu et al. |
| 2015/0071051 A1 | 3/2015 | Zhu et al. |
| 2015/0236822 A1 | 8/2015 | Pirskanen et al. |
| 2016/0227533 A1 | 8/2016 | Josiam et al. |
| 2016/0374093 A1 | 12/2016 | Asterjadhi et al. |
| 2017/0127298 A1 | 5/2017 | Ryu et al. |
| 2017/0273140 A1 | 9/2017 | Ryu et al. |
| 2018/0007712 A1 | 1/2018 | Lou et al. |
| 2018/0317128 A1 | 11/2018 | Chun et al. |

FOREIGN PATENT DOCUMENTS

| | | |
|---|---|---|
| EP | 2675081 A1 | 12/2013 |
| JP | 2009284479 A | 12/2009 |
| JP | 2009303213 A | 12/2009 |
| JP | 2014508488 A | 4/2014 |
| WO | WO-2014181177 A1 | 11/2014 |
| WO | WO-2015050995 A2 | 4/2015 |
| WO | WO-2015070230 A1 | 5/2015 |
| WO | WO-2015186887 A1 | 12/2015 |
| WO | WO-2016007774 | 1/2016 |
| WO | WO-2016060448 A1 | 4/2016 |

OTHER PUBLICATIONS

International Search Report and Written Opinion—PCT/US2016/036744—ISA/EPO—dated Aug. 25, 2016.

Ryu K., "UL MU Procedure; 11-15-0365-00-00ax-ul-mu-procedure", IEEE Draft; 11-15-0365-00-00AX-UL-MU-PROCEDURE, IEEE-SA Mentor, Piscataway, NJ USA, vol. 802. 11ax, Mar. 9, 2015 (Mar. 9, 2015), pp. 1-16, XP068083020, [retrieved on Mar. 9, 2015].

\* cited by examiner

METHODS AND APPARATUS FOR REQUESTING BUFFER STATUS REPORTS FOR IMPLEMENTING MULTIPLE USER UPLINK MEDIUM ACCESS CONTROL PROTOCOLS IN A WIRELESS NETWORK

CROSS-REFERENCE TO RELATED APPLICATION INFORMATION

The present Application is a Continuation of application Ser. No. 15/177,267, entitled "METHODS AND APPARATUS FOR REQUESTING BUFFER STATUS REPORTS FOR IMPLEMENTING MULTIPLE USER UPLINK MEDIUM ACCESS CONTROL PROTOCOLS IN A WIRELESS NETWORK" filed Jun. 8, 2016, which claims priority to Provisional Application No. 62/182,963 entitled "METHODS AND APPARATUS FOR REQUESTING BUFFER STATUS REPORTS FOR IMPLEMENTING MULTIPLE USER UPLINK MEDIUM ACCESS CONTROL PROTOCOLS IN A WIRELESS NETWORK" filed Jun. 22, 2015, and Provisional Application No. 62/190,142 entitled "METHODS AND APPARATUS FOR REQUESTING BUFFER STATUS REPORTS FOR IMPLEMENTING MULTIPLE USER UPLINK MEDIUM ACCESS CONTROL PROTOCOLS IN A WIRELESS NETWORK" filed Jul. 8, 2015, which are assigned to the assignee hereof and hereby expressly incorporated by reference herein for all purposes.

FIELD

Certain aspects of the present disclosure generally relate to wireless communications, and more particularly, to methods and apparatus for requesting buffer status reports for implementing multiple user uplink medium access control (MAC) protocols in a wireless network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need methods and apparatus for requesting buffer status reports for implementing multiple user uplink medium access control (MAC) protocols in a wireless network.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for allocating multi-user communication resources to one or more stations for uplink data transmissions. The method comprises generating a request frame requesting an uplink buffer report from each of the one or more stations, the request frame selectively requesting that the uplink buffer report indicate either an amount of data in an uplink buffer or a requested amount of time to transmit the data in the uplink buffer. The method comprises transmitting the request frame to each of the one or more stations. The method comprises receiving the uplink buffer report in a report frame from each of the one or more stations.

Another aspect of the disclosure provides a wireless device for allocating multi-user communication resources to one or more stations for uplink data transmissions. The wireless device comprises a processor configured to generate a request frame requesting an uplink buffer report from each of the one or more stations, the request frame selectively requesting that the uplink buffer report indicate either an amount of data in an uplink buffer or a requested amount of time to transmit the data in the uplink buffer. The wireless device comprises a transmitter configured to transmit the request frame to the one or more stations. The wireless device comprises a receiver configured to receive the uplink buffer report in a report frame from each of the one or more stations.

Another aspect of the disclosure provides a non-transitory, computer-readable medium that comprises code that, when executed, causes a wireless device to perform a method. The method comprises generating a request frame requesting an uplink buffer report from each of the one or more stations, the request frame selectively requesting that the uplink buffer report indicate either an amount of data in an uplink buffer or a requested amount of time to transmit the data in the uplink buffer. The method comprises transmitting the request frame to each of the one or more stations. The method comprises receiving the uplink buffer report in a report frame from each of the one or more stations.

Another aspect of the disclosure provides a wireless device for allocating multi-user communication resources to one or more stations for uplink data transmissions. The wireless device comprises means for generating a request frame requesting an uplink buffer report from each of the one or more stations. The request frame selectively requests that the uplink buffer report indicate either an amount of data in an uplink buffer or a requested amount of time to transmit the data in the uplink buffer. The wireless device comprises means for transmitting the request frame to the one or more stations. The wireless device comprises means for receiving the uplink buffer report in a report frame from each of the one or more stations.

Another aspect of the disclosure provides method for allocating multi-user communication resources to one or more stations for uplink data transmissions. The method comprises receiving a request frame requesting an uplink buffer report, the request frame selectively requesting that the uplink buffer report indicate either an amount of data in an uplink buffer or a requested amount of time to transmit the data in the uplink buffer. The method comprises generating a report frame comprising the requested uplink buffer report selectively indicating either the amount of data in the uplink buffer or the requested amount of time to transmit the data in the uplink buffer. The method comprises transmitting the report frame to a wireless device.

Another aspect of the disclosure provides a station for allocating multi-user communication resources for uplink data transmissions. The station comprises a receiver configured to receive a request frame requesting an uplink buffer report, the request frame selectively requesting that the uplink buffer report indicate either an amount of data in an uplink buffer or a requested amount of time to transmit the data in the uplink buffer. The station comprises a processor configured to generate a report frame comprising the requested uplink buffer report selectively indicating either the amount of data in the uplink buffer or the requested amount of time to transmit the data in the uplink buffer. The station comprises a transmitter configured to transmit the report frame to a wireless device.

Another aspect of the disclosure provides a non-transitory, computer-readable medium that comprises code that, when executed, causes a station to perform a method. The method comprises receiving a request frame requesting an uplink buffer report, the request frame selectively requesting that the uplink buffer report indicate either an amount of data in an uplink buffer or a requested amount of time to transmit the data in the uplink buffer. The method comprises generating a report frame comprising the requested uplink buffer report selectively indicating either the amount of data in the uplink buffer or the requested amount of time to transmit the data in the uplink buffer. The method comprises transmitting the report frame to a wireless device.

Another aspect of the disclosure provides a station for allocating multi-user communication resources for uplink data transmissions. The station comprises means for receiving a request frame requesting an uplink buffer report, the request frame selectively requesting that the uplink buffer report indicate either an amount of data in an uplink buffer or a requested amount of time to transmit the data in the uplink buffer. The station comprises means for generating a report frame comprising the requested uplink buffer report selectively indicating either the amount of data in the uplink buffer or the requested amount of time to transmit the data in the uplink buffer. The station comprises means for transmitting the report frame to a wireless device.

DETAILED DESCRIPTION

Figure 1:
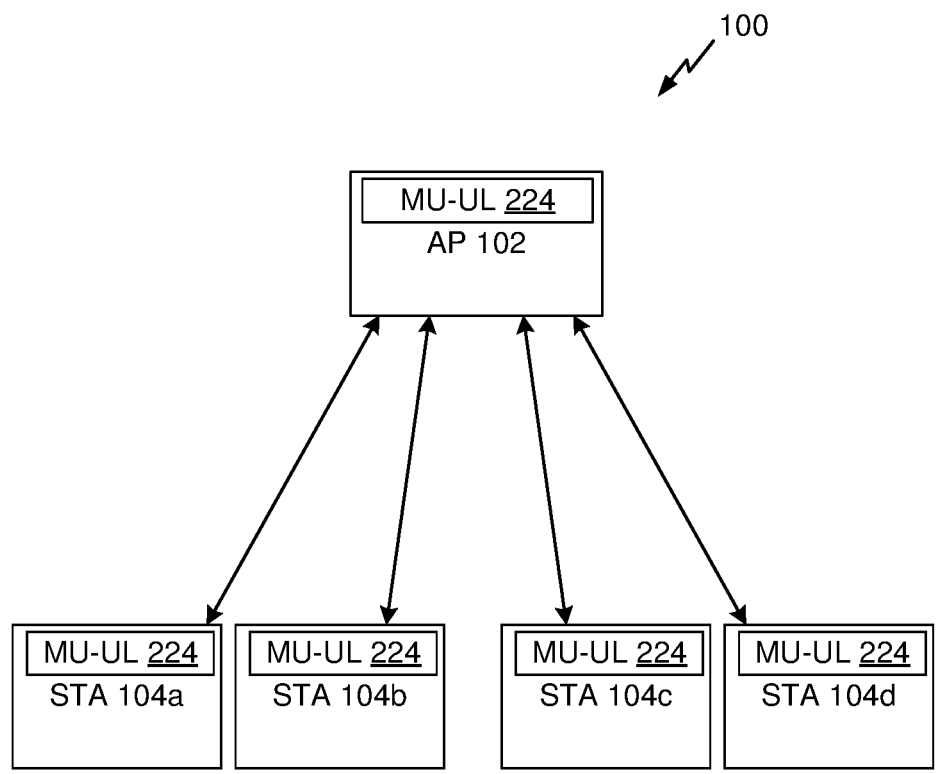
FIG. 1 illustrates a multiple-user wireless communication system with access points (APs) and user terminals (STAs), in accordance with some implementations.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 2GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates a multiple-user wireless communication system 100 with access points (APs) and user terminals (STAs), in accordance with some implementations. For simplicity, only one access point 102 is shown in FIG. 1. An access point is generally a fixed station that communicates with the user terminals and may also be referred to as a base station or using some other terminology. A user terminal, also known as a station ("STA"), may be fixed or mobile and may also be referred to as a mobile station or a wireless device, or using some other terminology. The access point 102 may communicate with one or more user terminals 104A, 104B, 104C, 104D (hereinafter collectively user terminals 104a-104d) at any given moment on the downlink and uplink. The downlink (i.e., forward link) is any communication link from the AP 102 to any of the user terminals 104a-104d, and the uplink (i.e., reverse link) is any communication link from the user terminals 104a-104d to the AP 102. A user terminal may also communicate peer-to-peer with another user terminal.

The system 100 may employ multiple transmit and multiple receive antennas for data transmission on the downlink and uplink. For example, the AP 102 is equipped with $N_{ap}$ antennas (not shown in FIG. 1) and represents the multiple-input (MI) for downlink transmissions and the multiple-output (MO) for uplink transmissions. A set of K selected user terminals 104a-104d (e.g., STAs 104a-104d) collectively represents the multiple-output for downlink transmissions and the multiple-input for uplink transmissions. Each selected user terminal may transmit user-specific data to and/or receive user-specific data from the access point. In general, each selected user terminal may be equipped with one or multiple antennas (i.e., $N_{ut} \geq 1$) (not shown in FIG. 1). The K selected user terminals can have the same number of antennas, or one or more user terminals may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 104a-104d share the same frequency channel by dividing transmission/reception into different time slots, where each time slot may be assigned to a different user terminal 104a-104d. As shown in FIG. 1, the AP 102 may include a multiple-user (MU) uplink module (UL) 224, which may be configured to perform one or more tasks as described in more detail in FIGS. 2-8 below. Moreover, each of the user terminals 104a-104d may include the MU-UL module 224. The MU-UL module 224 will be described in more detail in connection with FIG. 2 below.

Figure 2:
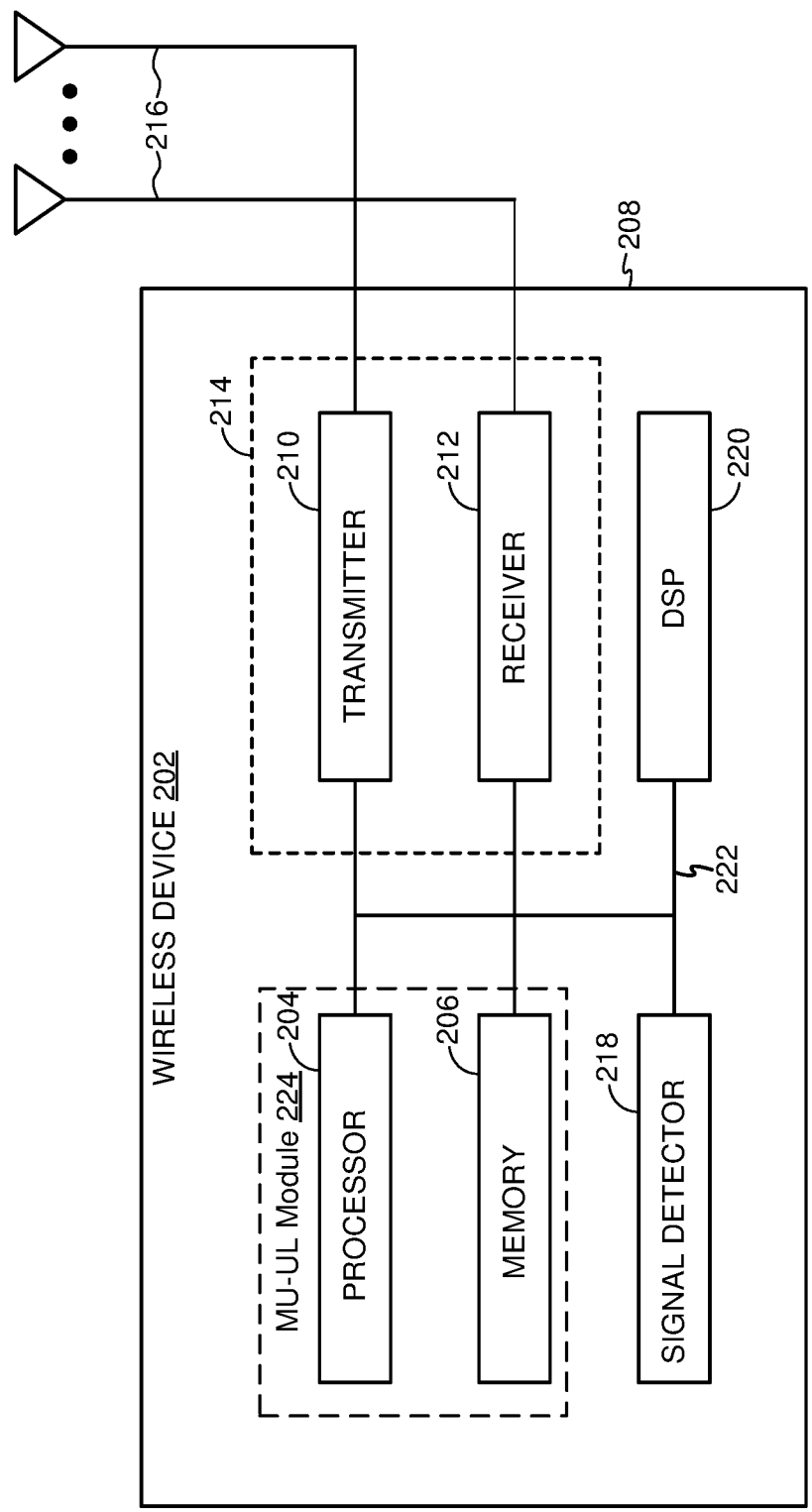
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. The wireless device 202 may implement the AP 102 or one of the user terminals 104a-104d.

The wireless device 202 may include the MU-UL module 224, which may include a processor 204 which controls operation of the wireless device 202. The processor 204 may also be referred to as a central processing unit (CPU). In some implementations, the MU-UL module 224 may additionally comprise memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include a non-transitory, computer-readable medium comprising code that, when executed, causes an apparatus or the processor 204 to perform any method described in the present application. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Thus, in some implementations, the processor 204 and/or the memory 206 may comprise or form at least a portion of means for generating a request frame requesting an uplink buffer report from each of the one or more stations and/or means for generating a report frame comprising a requested uplink buffer report selectively indicating either an amount of data in the uplink buffer or a requested amount of time to transmit the data in the uplink buffer.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. Thus, in some implementations, the transmitter 210 may comprise or form at least a portion of means for transmitting a request frame to one or more stations and/or means for transmitting a report frame to an access point. Likewise, the receiver 212 may comprise or form at least a portion of means for receiving an uplink buffer report in a report frame from each of one or more stations and/or means for receiving a request frame requesting an uplink buffer report.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Certain aspects of the present disclosure support transmitting an uplink (UL) signal from multiple user terminals to an AP. In some implementations, the UL signal may be transmitted in a multi-user MIMO (MU-MIMO) system. Alternatively, the UL signal may be transmitted in a multi-user FDMA (MU-FDMA) or similar FDMA system. In these implementations, UL-MU-MIMO or UL-FDMA transmissions can be sent simultaneously from multiple user terminals to an AP and may create efficiencies in wireless communication.

An increasing number of wireless and mobile devices put increasing stress on bandwidth requirements that are demanded for wireless communications systems. With limited communication resources, it is desirable to reduce the amount of traffic passing between the AP and the multiple STAs. For example, when multiple terminals send uplink communications to the access point, it is desirable to minimize the amount of traffic to complete the uplink of all transmissions. Thus, implementations described herein support utilizing communication exchanges, scheduling and certain frames for increasing throughput of uplink transmissions to the AP.

For efficient allocation of UL resources, the AP should have some mechanism for determining an uplink buffer status of the STAs associated with that AP. This allows for the AP to allocate resources (e.g., frequency bandwidth, channels and durations within those bandwidths or channels) to STAs having queued uplink data ready for transmission in their uplink buffers. Moreover, being able to determine the uplink buffer status of the STAs associated with a particular AP may allow that AP to optimize the allocation of those resources based on the amount of uplink data queued for transmission at each of the STAs. Thus, the present application describes implementations by which a buffer status reporting mechanism may provide information to the AP regarding the amount of data queued for transmission in each STA associated with a particular AP.

Figure 3A:
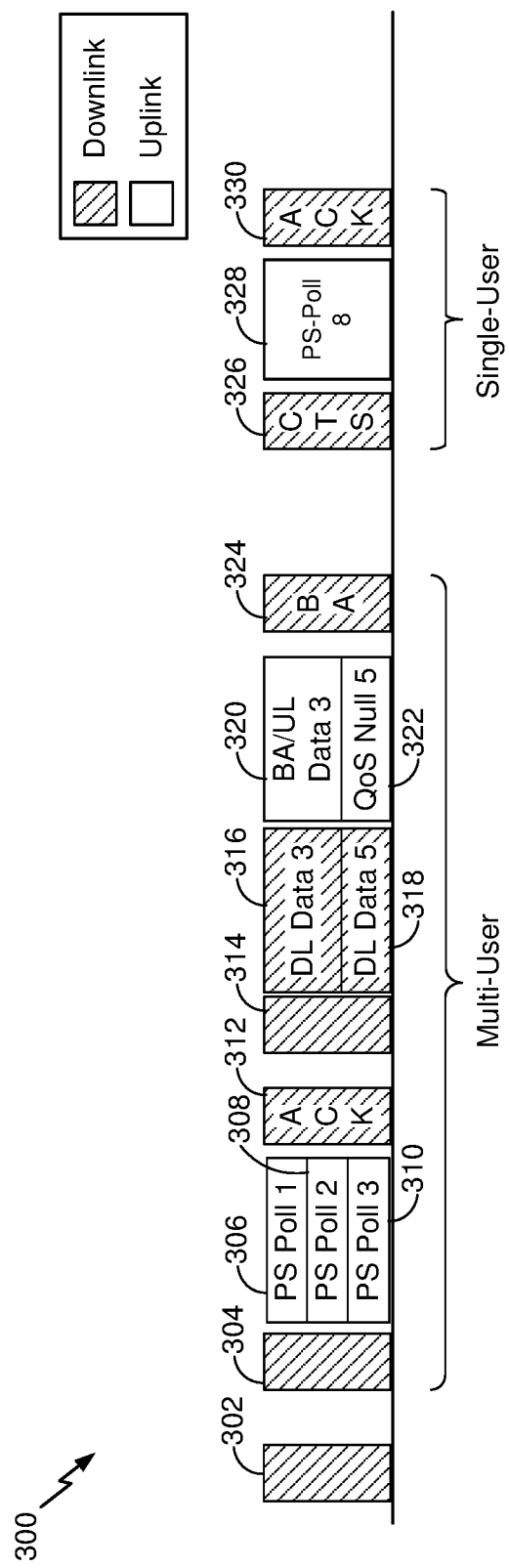
FIG. 3A shows a time diagram of a frame exchange for setting up a multi-user (MU) uplink communication between an access point and a plurality of stations, in accordance with some implementations.

FIG. 3A shows a time diagram 300 of a frame exchange for setting up a multi-user (MU) uplink communication between an access point (e.g., the AP 102 of FIG. 1) and a plurality of stations (e.g., the STAs 104a-104d), in accordance with some implementations. Messages or frames sent in the downlink direction (e.g., from an AP to an STA) are shown having a diagonal hatch pattern, while messages or frames sent in the uplink direction (e.g., from an STA to the AP) are shown without a pattern. FIG. 3A shows a beacon frame 302, which may be transmitted periodically by the AP 102 for advertising the presence of a wireless LAN that includes the AP 102. In order for the AP 102 to optimally schedule channel resources to more than one STA, the AP 102 may solicit an uplink buffer report (306, 308, 310 in FIG. 3A) from one or more STAs by sending polling frames. The present application contemplates at least two frames that may act as polling frames for this purpose: trigger frames for soliciting uplink buffer reports from STAs while in a multi-user mode (304, 314 in FIG. 3A, 354, 364 in FIG. 3B, and 400 in FIG. 4), and specially modified clear to send (CTS)-to-self frames (326 in FIG. 3A and 500 in FIG. 5) for soliciting uplink buffer reports from an STA in a single-user mode. Such frames may be known as a "request frame 304, 314, 326, 354, 364, 400, 500." The present application contemplates at least four report frames that may be utilized by the polled STAs to transmit an uplink buffer report back to the AP: Quality of Service (QoS) null frames (600, see FIG. 6), QoS data frames (700, see FIG. 7), PS-Poll frames (800, see FIG. 8), and HE control frames (900, see FIG. 9). Such frames may be known as a "report frame 306, 308, 310, 322, 328, 600, 700, 800, 900." FIG. 3A illustrates two examples of solicitation in MU mode using trigger frames 304, 314 and one example of solicitation in SU mode using a CTS-to-self frame 326.

In the first example related to solicitation of the uplink buffer report via trigger frames in MU mode, the AP 102 may transmit a trigger frame 304, the reception of which by any associated STA would indicate, to the recipient STA, a request from the AP 102 for an uplink buffer report from the STA. The trigger frame 304 may additionally include information for allocating resources (e.g., one or more frequency bands or channels and a duration associated with those frequency bands or channels) to the one or more recipient STAs for transmitting the respective uplink buffer reports. The trigger frame 304 may also selectively request that the uplink buffer report indicate either an amount of data in an uplink buffer or a requested amount of time to transmit the data in the uplink buffer. The STAs addressed by the trigger frame 304 may then transmit their uplink buffer reports on the allocated resources and in the requested format. For example, assuming the trigger frame 304 was addressed to and included resource allocations for each of a first, second and third STA (e.g., STAs 104a, 104b, 104c of FIG. 1), the first STA may transmit the PS Poll 1 frame 306 including an uplink buffer report, the second STA may transmit the PS Poll 2 frame 308 including an uplink buffer report, and the third STA may transmit the PS Poll 3 frame 310 including an uplink buffer report in the allocated resources as shown. In response to accurately receiving the PS poll frames 306, 308, 310 including the uplink buffer reports, the AP 102 may transmit an acknowledge (ACK) frame 312 to the first, second and third STAs. This may be a preferred method when frames are exchanged during a multi-user (MU) transmit opportunity (TXOP). In some other implementations, the intended recipient STAs may be configured to send frames including the uplink buffer reports at random times, where the trigger frame is a trigger frame allowing random access (e.g., a TF-R trigger frame). Upon receiving the uplink buffer reports in the report frames (e.g., the PS Poll frames 306, 308, 310) the AP 102 may send a message allocating communication resources to the one or more stations (e.g., the stations 104C-104C) for uplink data transmissions based on the received uplink buffer report from each of the one or more stations. Thus, each station may receive the message from the access point 102 allocating a portion of the communication resources to the station for uplink data transmissions based at least in part on the uplink buffer report from the station.

In the second example related to solicitation of the uplink buffer report via trigger frames in MU mode, the AP 102 may transmit a trigger frame 314, the reception of which by any associated STA would indicate a request from the AP for an uplink buffer report from the STA Like the trigger frame 304, the trigger frame 314 may additionally include information for allocating resources (e.g., one or more frequency bands or channels and a duration associated with those frequency bands or channels) to the one or more recipient STAs for transmitting the respective uplink buffer reports, as well as a request for the format of the uplink buffer report to be either an amount of queued data in an uplink buffer or a requested amount of time to transmit the queued data in the uplink buffer. The STAs addressed by the trigger frame 304 may then transmit their uplink buffer reports on the allocated resources and in the requested format. For example, assuming the trigger frame 314 was addressed to and included resource allocations for a fifth STA (not shown in FIG. 1), the fifth STA may transmit a QoS null frame 322 including an uplink buffer report in the allocated resources. FIG. 3A additionally shows downlink data frames 316 and 318 transmitted by the AP 102 to third and fifth STAs, respectively, after the trigger frame 314 and in their respective resource allocations. FIG. 3A additionally shows an ACK and uplink data frame 320 transmitted by the third STA in response to receiving the downlink data frame 316. Frames 316, 318 and 320 are not directly related to the uplink buffer report solicitation and providing but are shown for context and emphasis in a MU communication scheme. In response to accurately receiving the QoS null frame 322 including the uplink buffer report (as well as in response to accurately receiving the ACK and uplink data frame 316), the AP 102 may transmit a block acknowledge (BA) frame 324 to the third and fifth STAs. The frames 304 to 324 are shown as part of a multi-user implementation.

In a first example related to solicitation of the uplink buffer report via trigger frames in SU mode, the AP 102 may transmit a CTS-to-self frame 326, the reception of which by the associated STA would indicate a request from the AP 102 for an uplink buffer report from the STA. In such an SU mode operation, the recipient STA may have control of its transmission parameters, which is desirable in SU mode especially in the case of transmission power imbalances in the network. In contrast to conventional utilization of the CTS-to-self frame, where a receiver address (RA) of the CTS-to-self frame is populated with an identifier associated with the same device that generated the frame, the receiver address (RA) of the CTS-to-self frame 326 is populated with an identifier associated with the target STA from which an uplink buffer report is to be solicited. The CTS-to-self frame 326 may additionally include information allocating resources (e.g., one or more frequency bands or channels and a duration associated with those frequency bands or channels) to the recipient STA for transmitting the respective uplink buffer reports, and a request for the format of the uplink buffer report to be either an amount of queued data in an uplink buffer or a requested amount of time to transmit the queued data in the uplink buffer. The STA addressed by the CTS-to-self frame 326 may then transmit its uplink buffer report on the allocated resources and in the requested format. For example, assuming the CTS-to-self frame 326 was addressed to and included resource allocations for an eighth STA (not shown in FIG. 1), the eighth STA may transmit a PS-Poll frame 328 including an uplink buffer report in the allocated resources. In response to accurately receiving the PS poll frame 328 including the uplink buffer report, the AP 102 may transmit an ACK frame 330 to the eighth STA. This may be a preferred method when frames are exchanged during a single-user (SU) transmit opportunity (TXOP). The frames 326 to 330 are shown as part of a single-user implementation.

Figure 3B:
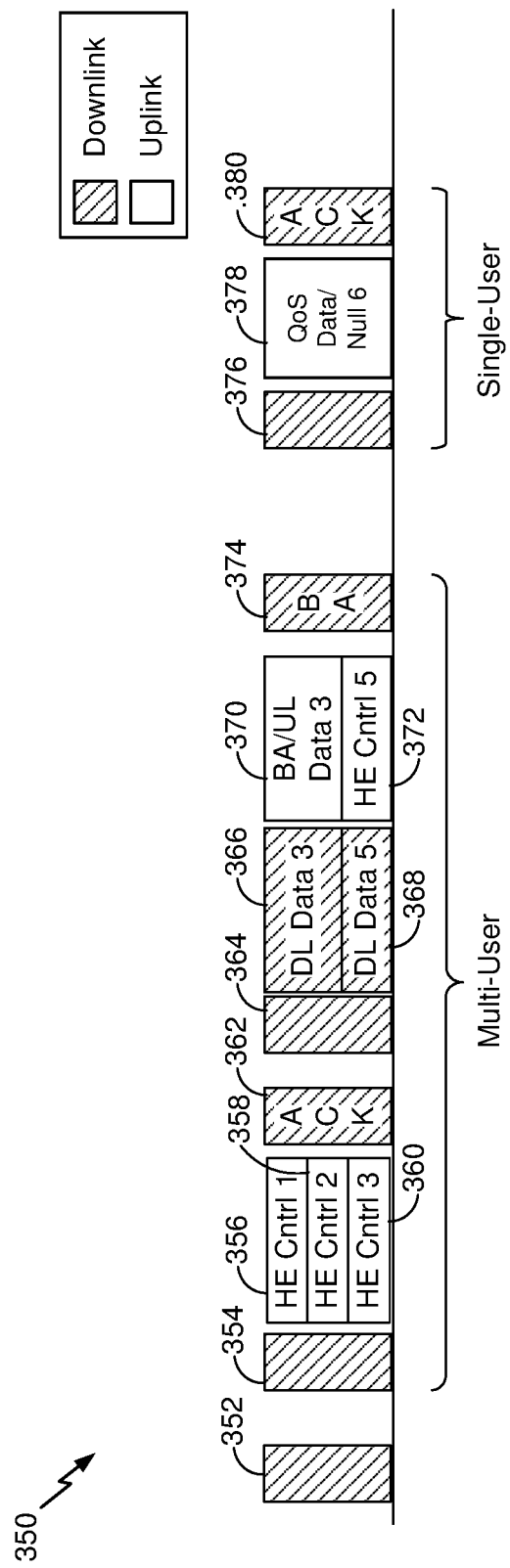
FIG. 3B shows another time diagram of a frame exchange for setting up a multi-user (MU) uplink communication between an access point and a plurality of stations, in accordance with some implementations.

FIG. 3B shows another time diagram 350 of a frame exchange for setting up a multi-user (MU) uplink communication between an access point (e.g., the AP 102 of FIG. 1) and a plurality of stations (e.g., the STAs 104a-104d), in accordance with some implementations. Messages or frames sent in the downlink direction (e.g., from an AP to an STA) are shown having a diagonal hatch pattern, while messages or frames sent in the uplink direction (e.g., from an STA to the AP) are shown without a pattern. FIG. 3B shows a beacon frame 352, which may be transmitted periodically by the AP 102 for advertising the presence of a wireless LAN that includes the AP 102. In order for the AP 102 to optimally schedule channel resources to more than one STA, the AP 102 may solicit an uplink buffer report from one or more STAs by sending polling frames. Such frames may be known as a "request frame 304, 314, 326, 354, 364, 400, 500." The present application contemplates at least four report frames that may be utilized by the polled STAs to transmit an uplink buffer report back to the AP: Quality of Service (QoS) null frames (600, see FIG. 6), QoS data frames (700, see FIG. 7), PS-Poll frames (800, see FIG. 8), and HE control frames (900, see FIG. 9). Such frames may be known as a "report frame 306, 308, 310, 322, 328, 600, 700, 800, 900." FIG. 3B illustrates two examples of solicitation in MU mode using trigger frames 354, 364 and one example of solicitation in SU mode using a trigger frame 376.

In the first example related to solicitation of the uplink buffer report via trigger frames in MU mode, the AP 102 may transmit a trigger frame 354, the reception of which by any associated STA would indicate, to the recipient STA, a request from the AP 102 for an uplink buffer report from the STA. The trigger frame 354 may additionally include information for allocating resources (e.g., one or more frequency bands or channels and a duration associated with those frequency bands or channels) to the one or more recipient STAs for transmitting the respective uplink buffer reports. The trigger frame 354 may also selectively request that the uplink buffer report indicate either an amount of data in an uplink buffer or a requested amount of time to transmit the data in the uplink buffer. The STAs addressed by the trigger frame 354 may then transmit their uplink buffer reports on the allocated resources and in the requested format. For example, assuming the trigger frame 354 was addressed to and included resource allocations for each of a first, second and third STA (e.g., STAs 104a, 104b, 104c of FIG. 1), the first STA may transmit the HE Control 1 frame 356 including an uplink buffer report, the second STA may transmit the HE Control 2 frame 358 including an uplink buffer report, and the third STA may transmit the HE Control 3 frame 360 including an uplink buffer report in the allocated resources as shown. In response to accurately receiving the HE Control frames 356, 358, 360 including the uplink buffer reports, the AP 102 may transmit an acknowledge (ACK) frame 362 to the first, second and third STAs. This may be a preferred method when frames are exchanged during a multi-user (MU) transmit opportunity (TXOP). In some other implementations, the intended recipient STAs may be configured to send frames including the uplink buffer reports at random times, where the trigger frame is a trigger frame allowing random access (e.g., a TF-R trigger frame). Upon receiving the uplink buffer reports in the report frames (e.g., the HE Control frames 356, 358, 360) the AP 102 may send a message allocating communication resources to the one or more stations (e.g., the stations 104C-104C) for uplink data transmissions based on the received uplink buffer report from each of the one or more stations. Thus, each station may receive the message from the access point 102 allocating a portion of the communication resources to the station for uplink data transmissions based at least in part on the uplink buffer report from the station.

In the second example related to solicitation of the uplink buffer report via trigger frames in MU mode, the AP 102 may transmit a trigger frame 364, the reception of which by any associated STA would indicate a request from the AP for an uplink buffer report from the STA Like the trigger frame 354, the trigger frame 364 may additionally include information for allocating resources (e.g., one or more frequency bands or channels and a duration associated with those frequency bands or channels) to the one or more recipient STAs for transmitting the respective uplink buffer reports, as well as a request for the format of the uplink buffer report to be either an amount of queued data in an uplink buffer or a requested amount of time to transmit the queued data in the uplink buffer. The STAs addressed by the trigger frame 354 may then transmit their uplink buffer reports on the allocated resources and in the requested format. For example, assuming the trigger frame 364 was addressed to and included resource allocations for a fifth STA (not shown in FIG. 1), the fifth STA may transmit a HE Control 5 frame 372 including an uplink buffer report in the allocated resources. FIG. 3B additionally shows downlink data frames 366 and 368 transmitted by the AP 102 to third and fifth STAs, respectively, after the trigger frame 364 and in their respective resource allocations. FIG. 3B additionally shows an ACK and uplink data frame 370 transmitted by the third STA in response to receiving the downlink data frame 366. Frames 366, 368 and 370 are not directly related to the uplink buffer report solicitation and providing but are shown for context and emphasis in a MU communication scheme. In response to accurately receiving the HE Control 5 372 including the uplink buffer report (as well as in response to accurately receiving the ACK and uplink data frame 366), the AP 102 may transmit a block acknowledge (BA) frame 374 to the third and fifth STAs. The frames 354 to 374 are shown as part of a multi-user implementation.

In a first example related to solicitation of the uplink buffer report via trigger frames in SU mode, the AP 102 may transmit a trigger frame 376, the reception of which by the associated STA would indicate a request from the AP 102 for an uplink buffer report from the STA. In such an SU mode operation, the recipient STA may have control of its transmission parameters, which is desirable in SU mode especially in the case of transmission power imbalances in the network. The trigger frame 376 may include information allocating resources (e.g., one or more frequency bands or channels and a duration associated with those frequency bands or channels) to the recipient STA for transmitting the respective uplink buffer reports, and a request for the format of the uplink buffer report to be either an amount of queued data in an uplink buffer or a requested amount of time to transmit the queued data in the uplink buffer. The STA addressed by the trigger frame 376 may then transmit its uplink buffer report on the allocated resources and in the requested format. For example, assuming the trigger frame 376 was addressed to and included resource allocations for a sixth STA (not shown in FIG. 1), the sixth STA may transmit a QoS null or QoS data frame 378 including an uplink buffer report in the allocated resources. In response to accurately receiving the HE Control frame 376 including the uplink buffer report, the AP 102 may transmit an ACK frame 370 to the sixth STA. This may be a preferred method when frames are exchanged during a single-user (SU) transmit opportunity (TXOP). The frames 376 to 380 are shown as part of a single-user implementation.

Figure 4:
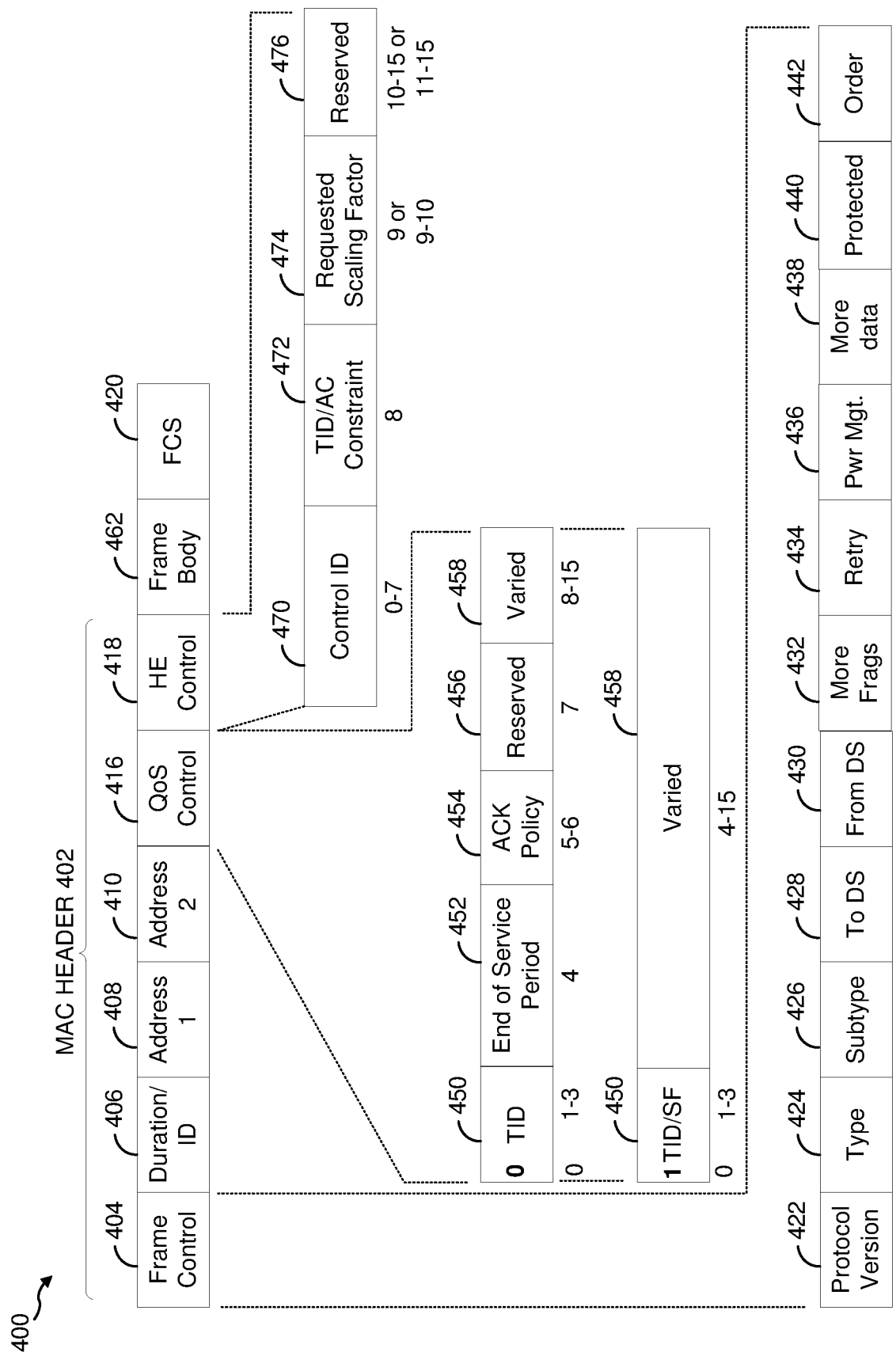
FIG. 4 illustrates a trigger frame format for requesting an uplink buffer status report from a station, in accordance with some implementations.

FIG. 4 illustrates a trigger frame 400 format for reporting uplink buffer status, in accordance with some implementations. The trigger frame 400 may correspond to the trigger frames 304, 314, 354, 364, 376 as previously described in connection with FIGS. 3A and 3B. The trigger frame 400 may include a MAC header 402 including the following fields: a frame control (fc) field 404, a duration/identification (ID) field 406, a receiver address (a1) field 408, a transmitter address (a2) field 410, a quality of service (QoS) control field 416, and a High Efficiency (HE) control field 418, which may be a high efficiency variant of a high throughput (HT) control field. The trigger frame 400 may additionally include a frame body field 462 and a frame check sequence (FCS) field 420. Each of the a1 and a2 fields 408, 410 may comprise a full MAC address of a device, which is a 48-bit (6 octet) value, or alternatively, any of these fields may comprise an associated identification (AID) based on a short MAC header format.

In addition, each of the above-described fields may comprise one or more subfields or fields. For example, the frame control field 402 may include one or more of the following plurality of subfields: a protocol version subfield 422, a type subfield 424, a subtype subfield 426, a to distributed system (DS) subfield 428, a from DS subfield 430, a more fragments subfield 432, a retry subfield 434, a power management subfield 436, a more data subfield 438, a protected subfield 440 and an order subfield 442. In some implementations, a value of 1 in the more data subfield 438 may indicate that the frame 400 is a request frame for requesting an uplink buffer report from one or more STAs. In some implementations, the trigger frame 400 may comprise any frame having a "control" type indicated, e.g., in the type field 424 and/or subtype field 426 of the frame control field 404 and having the HE control field 418.

The HE control field 418 may comprise 2 bytes (e.g., 16 bits) and may include a control ID subfield 470, an AC constraint subfield 472, a requested scaling factor subfield 474 and a reserved subfield. The AC constraint subfield 472 may comprise one bit. One of a 0 and 1 value in the AC constraint subfield 472 may indicate that an uplink buffer report that is valid for data of all access classes or categories is requested, while the other of the 0 and 1 value in the AC constraint subfield 472 may indicate that an uplink buffer report valid for data (traffic) of specific access classes or categories, as indicated in, e.g., the QoS control field 416, is requested by the generating AP. The requested scaling factor subframe 474 may comprise one or two bits utilized to indicate a requested scaling factor or granularity that an uplink buffer report should use when indicating the amount of buffered uplink data or the requested amount of time to transmit the buffered uplink data. For example, values of 0, 1, 2, or 3 may indicate granularity or step sizes of 4, 16, 64 and 256 bytes per unit, respectively, for example, when amount of buffered uplink data is requested for the report. Similarly, values of 0, 1, 2, or 3 may indicate granularity or step sizes of 4 µs, 8 µs, 16 µs, and 32 s per unit, respectively, for example, when requested time to transmit the buffered uplink data is requested for the report. In certain implementations more than one HE control field 418 may be included in the frame 400 as part of an HE Aggregated (A-) control field. The QoS control field 416 may comprise one or more of the following subfields: a traffic identifier (TID) subfield 450, an end of service period subfield 452, an ACK policy subfield 454, a reserved field 456, and a varied field 458. In certain implementations the reserved field 456 may include an indication that the frame 400 carries an aggregated medium access control service data unit (A-MSDU). The QoS control field 416 may be 2 bytes in length (16 bits) and may, in some implementations, be divided between the above-mentioned subfields as follows: 4 bits, 1 bit, 2 bits, 1 bit and 8 bits, respectively. The TID subfield 450 has 4 bits and may indicate the traffic identifier, access category or access class of data transmitted between the AP and a STA for that frame (e.g., MPDU). In some implementations, the values in the TID subfield 450 may indicate the traffic identifier, access category or class for which an uplink buffer report is solicited by the AP 102. Such traffic identifiers may be identified by any value from 0 to 14 and such access categories or classes may be any of: background data, best effort data, video data and voice data. These traffic identifiers, access categories or classes may correspond to those previously described in connection with the AC constraint subfield 472 in the HE control field 418.

In certain implementations the most significant bit (e.g., the first bit) of the TID field 450 may be used to signal that certain fields of the QoS Control field 416 are overloaded. As an example, the most significant bit of the TID field 450 (e.g., the first bit) set to 1 indicates that one or more of the following fields contain values that have a different interpretation from when the most significant bit of the TID field 450 is set to 0: one or more of the 3 LSBs of the TID field 450 (e.g, the second through fourth bits), the end of service period field 452, the ACK policy field 454 and the varied field 458. In some implementations, the 3 LSBs of the TID field 450 may include the scaling factor that indicates the requested granularity that an uplink buffer report should use when indicating the amount of buffered uplink data or the requested amount of time to transmit the buffered uplink data. For example, if the first bit of the TID field 450 is a "0," then the second through fourth bits (B1-B3) may include the traffic identifier of the traffic type for which a buffer report is requested. However, if the first bit of the TID field 450 is a "1," (e.g., non-zero) then at least the second and third bits (B1-B2) of the TID field 450 may include the requested scaling factor. In this case, a value 0 (e.g., "00") in the second and third bits of the TID field 450 indicate that a requested amount of time to transmit the data in the uplink buffer is requested in the resulting buffer reports and that an implicit scaling factor of 8 µs per unit should be used in the resulting buffer reports. Contrarily, a value of 1 to 3 in the second and third bits of the TID field 450 implicitly indicates that an amount of data in the uplink buffer is requested in the resulting buffer reports. A value of 1 (e.g., "01") in the second and third bits of the TID field 450 may indicate a scaling factor or granularity of 8 Bytes per unit, providing a value range of 0 to ~32 Kbytes. Similarly, a value of 2 (e.g., "10") in the second and third bits of the TID field 450 may indicate a scaling factor or granularity of 256 Bytes per unit, providing a value range of 0 to ~1 Mbyte. A value of 3 (e.g., "11") in the second and third bits of the TID field 450 may indicate a scaling factor or granularity of 4096 Bytes per unit, providing a value range of 0 to ~16 Mbytes. Where a scaling factor is not present, a default scaling factor may be assumed (e.g., 1). Similarly the remaining fields of the QoS Control field 416 can be interpreted such that the varied field 458 is expanded in length from 8 bits (i.e., from B8 to B15) to a longer length of, e.g., 11 bits (i.e., from B4 to B15). In some implementations, the modified varied field 458 having, e.g., 11 bits, may be utilized to indicate a beginning time of a next service period in which the buffer reports may be transmitted to the requesting device. In this way it is possible to signal a wider range of values for the requested amount of time to transmit the buffered uplink data (TXOP Duration Requested) and/or the amount of buffered uplink data (Queue Size). In some implementations, since the Ack policy field 454 is overloaded, in its absence the intended receiver of the frame 400 that contains the QoS Control field 416 may use a predetermined Ack policy value which may be obtained from other parts of the frame 400 or from other frames contained in the PPDU (e.g., as part of an A-MPDU). Although the QoS control field 416 is shown as being located external and adjacent to the HE control field 418, in some implementations, the QoS control field 416 may also or alternatively be located within the HE control field 418. In yet other implementations, the QoS control field may be located in a PHY header of the frame 400 (PHY header not shown in FIG. 4).

Figure 5:
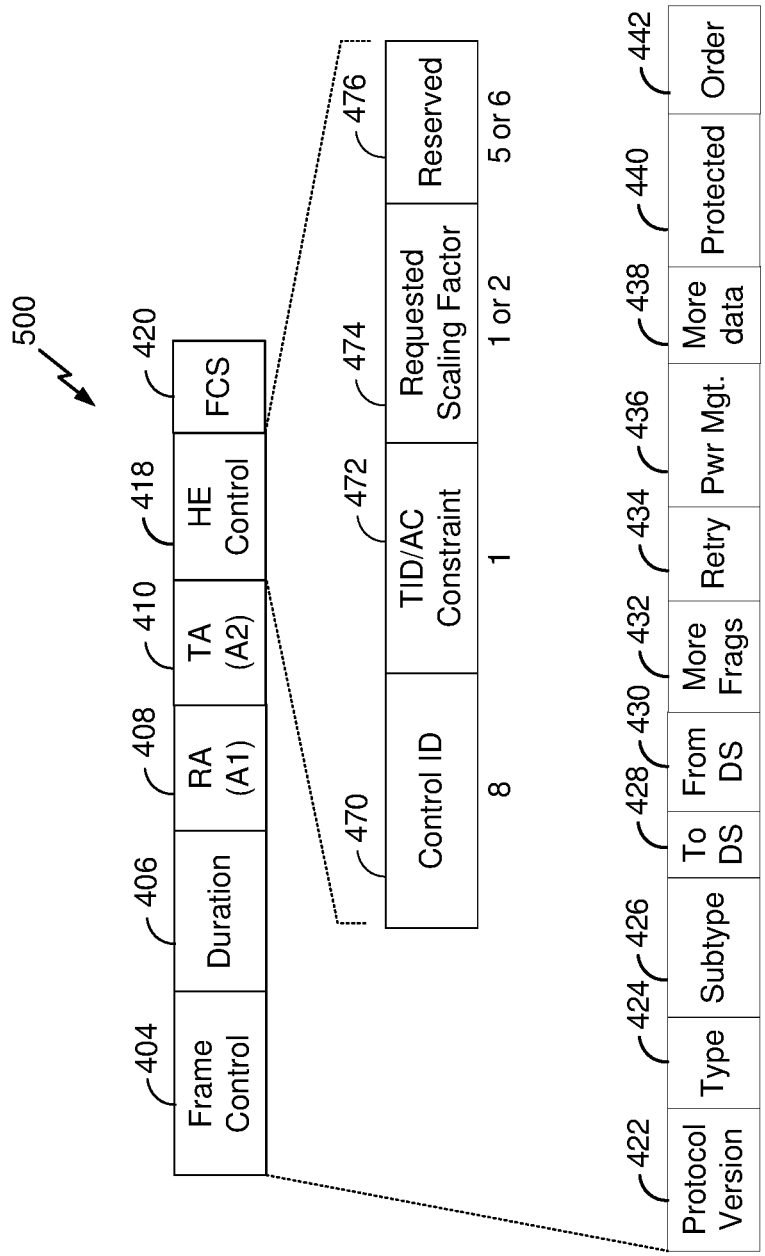
FIG. 5 illustrates a clear to send (CTS)-to-self frame format for requesting an uplink buffer status report from a station, in accordance with some implementations.

As previously described in connection with FIG. 3A, a CTS-to-self frame may be utilized by the AP to solicit or request an uplink buffer report from an STA in a single-user mode. FIG. 5 illustrates a modified clear to send (CTS)-to-self frame 500 format for requesting an uplink buffer status report from a station, in accordance with some implementations. The CTS-to-self frame 500 may include at least 6 fields as previously described in connection with FIG. 4: the frame control (FC) field 404, the duration field 406, the receiver address (RA) field 408 (also referred to as a receiver address (a1)), the transmitter address (TA) field 410, and the frame check sequence (FCS) field 420.

The frame control field 404 may include one or more of the plurality of subfields as previously described in connection with FIG. 4: the protocol version subfield 422, the type subfield 424, the subtype subfield 426, the to distributed system (DS) subfield 428, the from DS subfield 430, the more fragments subfield 432, the retry subfield 434, the power management subfield 436, the more data subfield 438, the protected subfield 440 and the order subfield 442.

The duration field 406 may indicate a duration for a receiving STA to transmit a subsequent frame including the uplink buffer report, as previously described in connection with FIG. 3A. The RA field 408 may include an identification or address of the intended recipient STA for the CTS-to-self frame 400, which is contrary to the conventional utilization of the CTS-to-self frame, where the RA field 408 must include the identification or address of the device generating the CTS-to-self frame. Moreover, conventionally, the CTS frame is generated and transmitted in response to receiving a request to send (RTS) frame. In the present application, increased flexibility is contemplated at least in that the CTS frame 400 is not necessarily generated and transmitted in response to receipt of such an RTS frame. The TA field 410 may include an identification or address of the generating device (e.g., an AP). The HE control field 418 may include at least each of the four subfields with functions as previously described in connection with the trigger frame 400 of FIG. 4. Finally, the FCS field 420 may include information utilized by a receiving device for error checking purposes. Although implementations of the CTS-to-self frame 500 have been described as having a particular format, the present application is not so limited and the CTS-to-self frame 500 may have any other new frame format or configuration.

Figure 6:
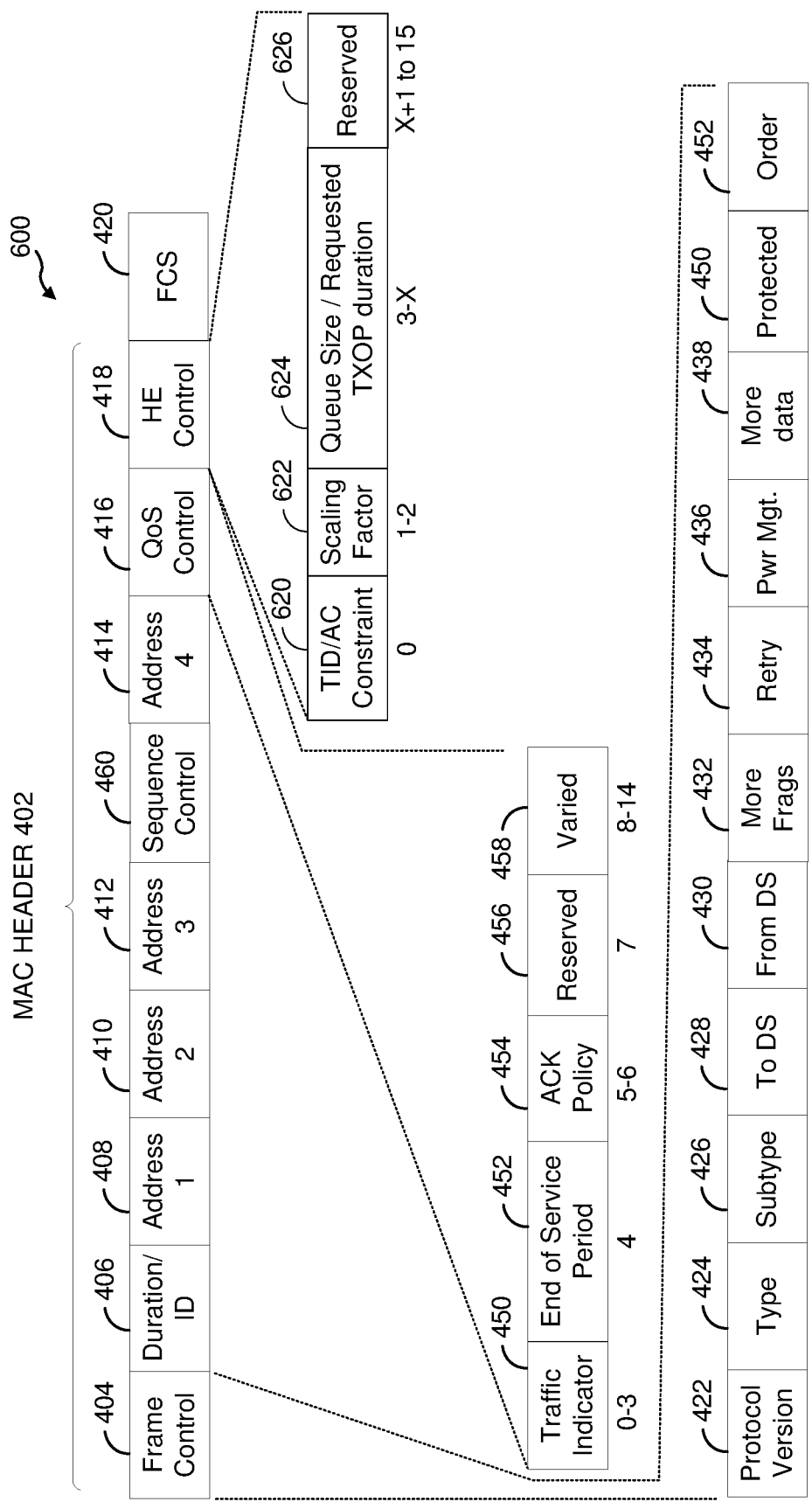
FIG. 6 illustrates a quality of service (QoS) null frame format for reporting uplink buffer status, in accordance with some implementations.
Figure 7:
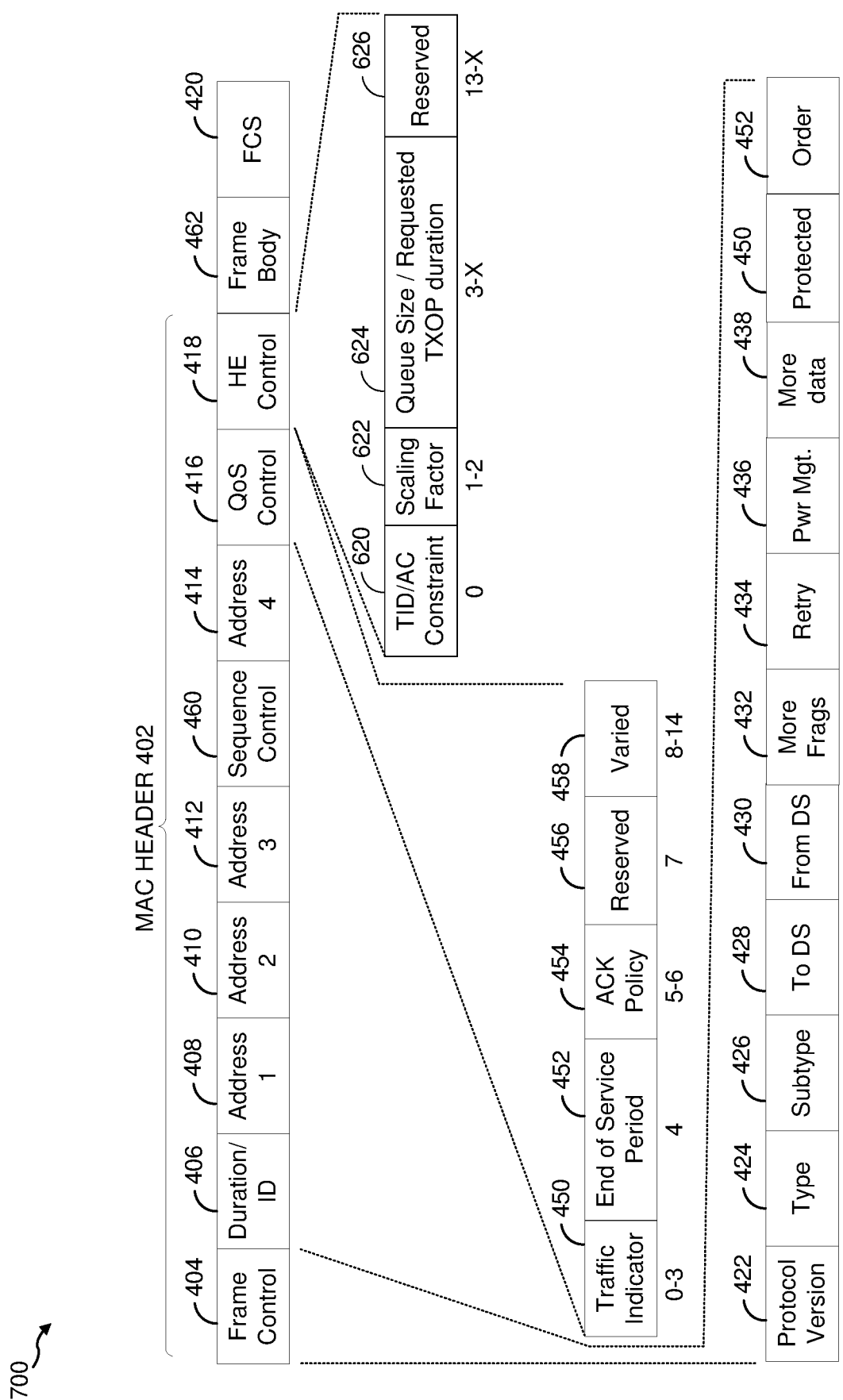
FIG. 7 illustrates a quality of service (QoS) data frame format for reporting uplink buffer status, in accordance with some implementations.
Figure 8:
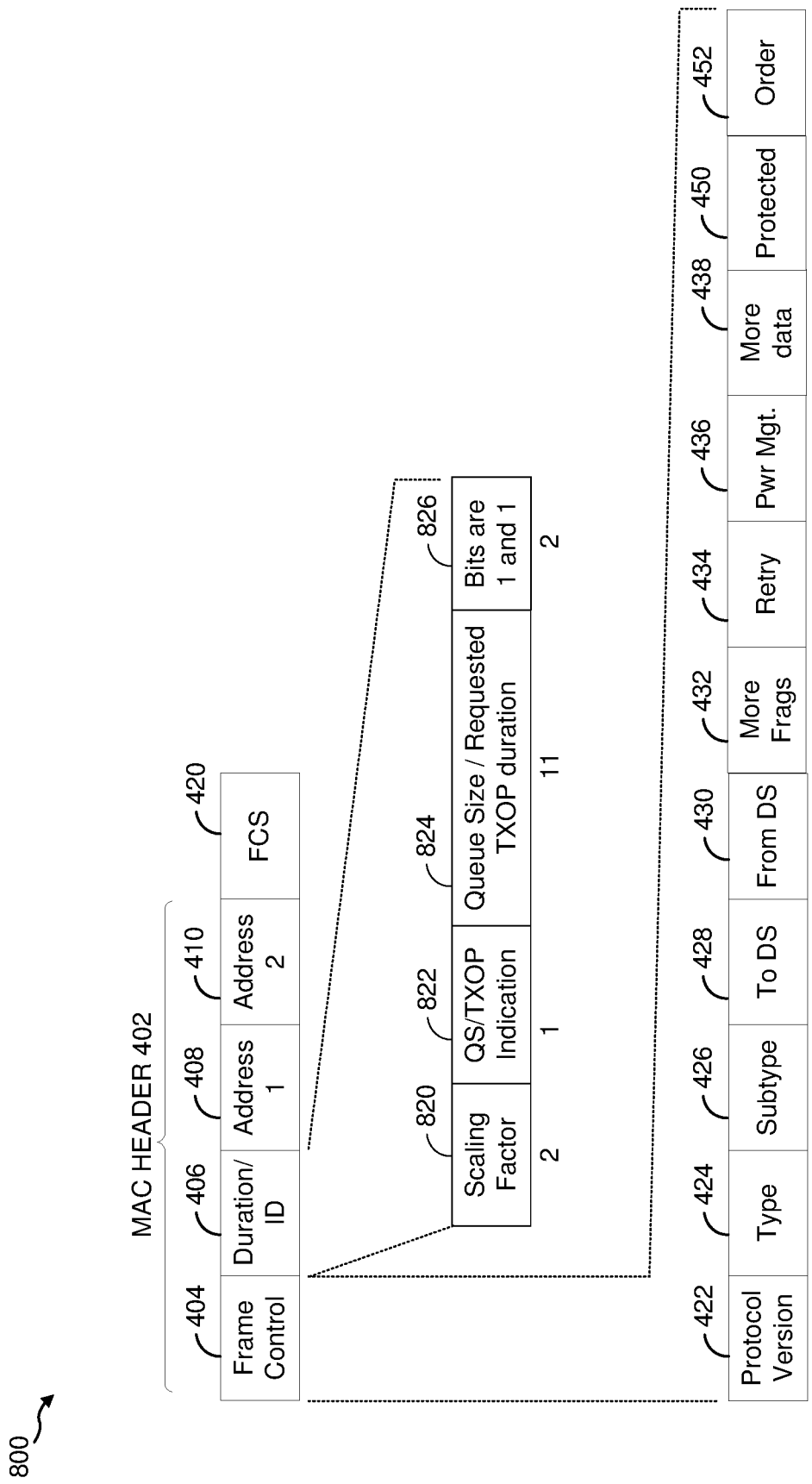
FIG. 8 illustrates a power save (PS) poll frame format for reporting uplink buffer status, in accordance with some implementations.

FIGS. 6-8 describe the formats of different types of frames that may be used to transmit the requested reports. FIG. 6 illustrates a quality of service (QoS) null frame 600 format for reporting uplink buffer status, in accordance with some implementations. The QoS null frame 600 may correspond to the QoS null frames 322 and 378 previously described in connection with FIGS. 3A and 3B. The QoS null frame 600 may include a MAC header 402 including at least the following fields, some of which have been previously described in connection with the trigger frame 400 of FIG. 4: the frame control (fc) field 404, the duration/identification (ID) field 406, the receiver address (a1) field 408, the transmitter address (a2) field 410, a destination address (a3) field 412, a sequence control field 460, a fourth address (a4) field 414, the quality of service (QoS) control field 416, and the High Efficiency (HE) control field 418. The QoS null frame 600 may additionally include the frame check sequence (FCS) field 420. With reference to the frame exchanges described in connection with FIGS. 3A and 3B, in response to receiving a trigger frame (e.g., trigger frames 304, 314) or a CTS-to-self frame (e.g., the CTS-to-self frame 326) the recipient STA may transmit the QoS null frame 600 and include the MAC address of the AP 102 in either of the a1 or a3 address fields 408, 412 and its own MAC address in the a2 field 410. This establishes the AP 102 as the recipient and the generating STA as the source of the QoS null frame 600.

In addition, each of the above-described fields may comprise one or more subfields or fields. For example, as shown in FIG. 6, the frame control field 404 may comprise one or more of the subfields previously described in connection with the frame control field 402 of the trigger frame 400 previously described in connection with FIG. 4: the protocol version subfield 422, the type subfield 424, the subtype subfield 426, the to distributed system (DS) subfield 428, the from DS subfield 430, the more fragments subfield 432, the retry subfield 434, the power management subfield 436, the more data subfield 438, the protected subfield 440 and the order subfield 442. In some implementations, the more data subfield 438 may be utilized to signal the presence of uplink buffer data for transmission by the generating STA. Accordingly, an AP may determine a presence of uplink data as indicated in the more data subfield 438 of the frame control field 404. However, since the more data subfield 438 is only 1 bit in length, this subfield may only indicate the presence but not the amount of buffered data or a requested length of time for transmitting that data.

The QoS control field 416 may comprise one or more of the subfields previously described in connection with the trigger frame 400 of FIG. 4: the traffic indicator (TID) subfield 450, the end of service period subfield 452, the ACK policy subfield 454, the reserved field 456, and the varied field 458. The varied subfield 458 has 8 bits that may be utilized to indicate either the amount of uplink data of the access category or access class indicated in the traffic indicator subfield 450, that is currently buffered for uplink transmission at the generating STA. Alternatively, the varied subfield 458 may indicate an amount of time requested by the generating STA to transmit the currently buffered uplink data having the access class or category indicated in the traffic indicator subfield 450. Thus, the AP 102 receiving the QoS null frame 600 may determine the amount of data in the uplink buffer or the requested amount of time to transmit the data in the uplink buffer as indicated in the quality of service control field 416. In some implementations, whether the 8 bits of the varied subfield 458 indicate the amount of buffered data or the requested amount of time for transmitting the buffered data may be determined based on an indication included in the previously received trigger frame (e.g., the trigger frames 304, 314, 354, 364, 376 of FIGS. 3A and 3B, shown in more detail in FIG. 4) or CTS-to-self frame (e.g., the CTS-to-self frame 326 of FIG. 3A, shown in more detail in FIG. 5). Generally, the amount of data will be indicated in the varied subfield 458 if the AP is in control of the UL transmission parameters and the amount of requested time for transmitting the buffered data will be indicated in the varied subfield 458 if the generating STA is in control of its own UL transmission parameters. Thus, in such implementations, the AP 102 receiving the QoS null frame 600 may determine whether the uplink buffer report indicates the amount of data in the uplink buffer or the requested amount of time to transmit the data in the uplink buffer based on whether uplink transmission parameters are controlled by the access point or by the station generating the QoS null frame 600 (e.g., the report frame).

Since the varied subfield 458 has 8 bits, it may take on any one of 256 potential values (e.g, $2^8=256$). Thus, where the varied subfield 458 includes an indication of the amount of uplink buffered data having the traffic category or traffic stream indicated in the traffic indicator subfield 450, the amount of traffic may be indicated such that each increment in the 256 potential values would indicate 256 octets (e.g., each octet is 1 byte or 8 bits) of queued data. Thus, values of 0 to 253 would indicate the amount of data between 0 and 64,768 octets (e.g., 253×256=64,768) of queued uplink data in steps of 256 octets, the value of 254 would indicate more than 64,768 octets of queued uplink data, and the value of 255 would indicate an unspecified or unknown amount of data. Alternatively, where the varied subfield 458 includes an indication of the requested time for transmitting the uplink buffered data having the traffic category or traffic stream indicated in the traffic indicator subfield 450, the requested time may be indicated such that each increment in the 256 potential values would indicate 32 μs of requested transmission time up to a maximum transmission time of 8,160 μs (e.g., 32 μs×255=8,160 μs).

However, in some implementations, such as some 802.11ax communication implementations, it may be desirable to be able to indicate the uplink buffer status with a higher resolution or greater granularity than increments of either 256 octets of queued data or 32 μs of requested transmission time for the queued data. This may be especially true, in the implementations indicating the amount of traffic, where the transmission rate is below 1 Mbps and, in the requested transmission time implementations, where the transmission rate is much greater than 1 Mbps. Increased resolution (e.g., granularity) may be achieved by further optimizing information carried in the QoS control field 416. For example, the increment for the amount of queued data (e.g., 256 octets per unit) or the increment for the requested transmission time (e.g., 32 μs per unit) described above may be reduced based on either a transmission bitrate or based on an indication further included in the QoS control field 416. For example, in some implementations, when the QoS null frame 600 is transmitted at 6 Mbps or less (for example), the increment in the amount of queued data may be 16 octets per unit rather than 256 octets per unit. Likewise, if the QoS null frame 600 is transmitted at 54 Mbps or greater (for example), the increment in the requested transmission time for the queued data may be 4 μs rather than 32 μs. Accordingly, there is an inverse relationship between the increment of queued data and the increment of requested transmission time, when based on the transmission bitrate. Thus, in such implementations, the AP 102 may determine a granularity with which the uplink buffer report indicates the amount of data in the uplink buffer or the requested amount of time to transmit the data in the uplink buffer based on a transmission rate of the QoS null frame 600 (e.g., the report frame). In some other implementations, any other information included in the QoS null frame 600 may be utilized to determine which increment per unit should be utilized. In yet other implementations, since the QoS control field 416 is 2 bytes in length (16 bits), the reserved subfield 456, having 1 bit (e.g., bit 7), may be utilized to signal which of the two above increments should be utilized. For example, if bit 7 in the reserved subfield 456 of the QoS control field 416 is set to a value of 1 one of the increments (e.g., one of 256 or 16 octets per unit for the amount of queued data and one of 32 μs or 4 μs for the requested time for transmission) may be utilized, while a set value of 0 may signal the use of the other increment. Thus, in such implementations, the AP 102 may determine a granularity with which the uplink buffer report indicates the amount of data in the uplink buffer or the requested amount of time to transmit the data in the uplink buffer as indicated in the quality of service field 416 of the QoS null frame 600 (e.g., the report frame). Further, in some other implementations, the reserved subfield 456, having 1 bit (e.g., bit 7), may be utilized to signal that the amount of queued data or requested transmission time applies to all traffic classes, access classes or categories.

In some other implementations, the HE control field 418 may be utilized to indicate the information of the uplink buffer report as previously described with respect to the QoS control field 416. For example, the HE control field 418 may include at least the following four subfields: an AC constraint subfield 620, a scaling factor subfield 622, a queue size or requested TXOP duration field 624 and a reserved field 626. The AC constraint subfield 620 may have a length of 1 bit and may indicate whether the following uplink buffer report indicates values for a particular traffic category or class or for all traffic categories or classes. The scaling factor subfield 622 may have a length of 2 bits and may indicated the granularity or step size of the following indication of the either amount of buffered uplink data or requested time to transmit the buffered uplink data, as previously described for the requested scaling factor subfield 474 of FIG. 4. The queue size or requested TXOP duration field 624 may include a first bit for indicating which of the amount of buffered uplink data or the requested time to transmit that buffered uplink data is included in the frame 600. The remaining bits of the queue size or requested TXOP duration field 624 indicate the amount of buffered uplink data or the requested time to transmit that buffered uplink data based on the value of the first bit, using the granularity or step size indicated in the scaling factor subfield 622.

FIG. 7 illustrates a quality of service (QoS) data frame 700 format for reporting uplink buffer status, in accordance with some implementations. The QoS data frame 700 may comprise each of the fields and subfields previously described for the QoS null frame 600 of FIG. 6 and may additionally include the frame body field 420, which may be configured to hold any type of data payload. The indication of either the amount of queued data in the uplink buffer request for an amount of transmission time may be indicated in the QoS data frame 700 in any manner previously described for the QoS null frame 600 of FIG. 6. Utilizing the QoS data frame 700 or the QoS null frame 600 allows the reporting of buffer reports on a per-TID basis. However, there are several limitations to the use of the QoS control field 416 as described in connection with the QoS data frame 700 or the QoS null frame 600. If utilizing the QoS control field may conventionally be limited to QoS null or data frames, since shorter frames such as Ack, BlockAck, etc. do not conventionally include the QoS control field. As will be described in connection with FIG. 9, this concept may be extended to HE control frames. Moreover, QoS null and data frames may be limited to reporting buffer status on a per-TID basis unless multiple QoS frames are transmitted for each TID. In addition, the range or granularity of the indication sent in the report is limited to the 8 bits of the varied field 458 as shown in FIGS. 6 and 7. The use of the HE control frame of FIG. 9 can increase this number of bits.

FIG. 8 illustrates a power save (PS) poll frame 800 format for reporting uplink buffer status, in accordance with some implementations. The PS poll frame 800 may correspond to the PS poll frame 328 of FIG. 3A. The PS poll frame 800 may comprise at least the frame control field 404, the duration field 406, the address 1 field 408, the address 2 field 410 and the FCS field 420 as previously described in connection with FIG. 7. Since PS poll frames are not related to traffic indications, e.g., they are not specific to any particular traffic class, access class or category, the signaling within the PS poll frame 800 will be cumulative, e.g., valid for all data access classes or categories. The duration field 406 may have a length of 2 bytes (e.g., 16 bits) and may comprise a plurality of subfields: a scaling factor subfield 820, a queue size or requested TXOP indication subfield 822, a queue size or requested TXOP duration field 824 and a reserved field 826. In the PS poll frame 800, where the 16 bits of the duration field 406 are labeled sequentially as bit 0 to bit 15, when bits 14 and 15 have a value of 1, bits 0 to 13 are considered reserved bits. Thus, the generating STA may indicate the amount of queued data or the requested transmission time in these 14 bits (e.g., bits 0 to 13). In some implementations, one of these 14 bits (e.g., bits 0 or 13 of bits 0 to 13) may be utilized to selectively indicate which of the amount of queued data or the requested transmission time is indicated in the remaining bits of bits 0 to 13 (e.g., the one bit of the queue size or requested TXOP indication subfield 822). For example, a 0 may indicate that one of the amount of queued data or the requested transmission time will be indicated in the queue size or requested TXOP duration field 824, while a 1 may indicate the other of the amount of queued data or the requested transmission time will be indicated in the queue size or requested TXOP duration field 824. The scaling factor subfield 820 may indicate the granularity or step size of the values indicated in the queue size or requested TXOP duration field 824 as previously described for the scaling factor subfield 622 of FIG. 6. Thus, the AP 102 receiving the PS poll frame 800 (e.g., the report frame) may determine the amount of data in the uplink buffer or the requested amount of time to transmit the data in the uplink buffer as indicated in the duration field 406. The AP 102 may additionally determine whether the uplink buffer report indicates the amount of data in the uplink buffer or the requested amount of time to transmit the data in the uplink buffer based on the indication provided by at least one bit of the duration field (e.g., the bits 0 or 13 of the duration field 406). In some implementations, the units for each increment in these 13 bits may be predetermined and may be the same or different from that previously described for the varied subfield 458 of the QoS null frame 600 in FIG. 6. In some other implementations, the units for each increment in these 13 bits may be signaled in any of the ways previously described in connection with the reserved subfield 456, the varied subfield 458, or implicitly based on the transmission data rate of the QoS null frame 600 in FIG. 6. Although the above additional functionality of the duration field 406 is described in connection with the PS poll frame 800 of FIG. 8, this functionality may apply equally to the frames described in connection with FIGS. 6 and 7.

Figure 9:
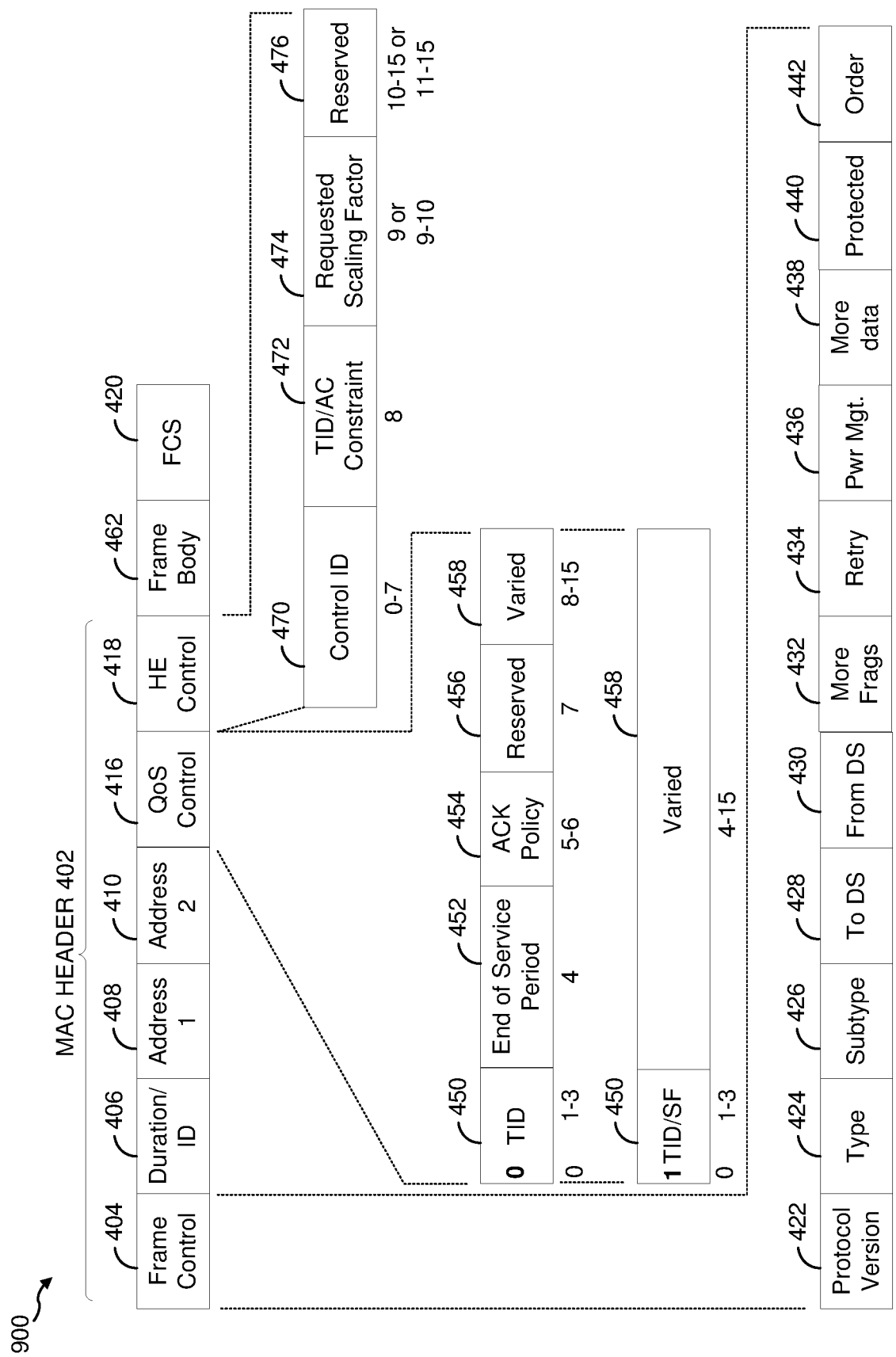
FIG. 9 illustrates a high efficiency (HE) control frame format for reporting uplink buffer status, in accordance with some implementations.

FIG. 9 illustrates a high efficiency (HE) control frame 900 format for reporting uplink buffer status, in accordance with some implementations. The HE control frame 900 may correspond to the HE control frames 356, 358, 360, 372 previously described in connection with FIGS. 3A and 3B. Since the HE control frame 900 may be a very short frame, minimal signal overhead is required to provide the requested buffer reports for all TIDs in a single frame, or per TID. The HE control frame 900 may include each field as previously described in connection with the trigger frame 400 of FIG. 4. As previously described for the trigger frame 400 of FIG. 4, the HE control frame 900 may comprise any frame having a "control" type indicated, e.g., in the type field 424 and/or subtype field 426 of the frame control field 404 and having the HE control field 418. It should be noted that conventional control frames do not include a QoS control field The QoS control field 416 may comprise one or more of the following subfields: a traffic identifier (TID) subfield 450, an end of service period subfield 452, an ACK policy subfield 454, a reserved field 456, and a varied field 458. In certain implementations the reserved field 456 may include an indication that the frame 900 carries an aggregated medium access control service data unit (A-MSDU). The QoS control field 416 may be 2 bytes in length (16 bits) and may, in some implementations, be divided between the above-mentioned subfields as follows: 4 bits, 1 bit, 2 bits, 1 bit and 8 bits, respectively. The TID subfield 450 has 4 bits and may indicate the traffic identifier, access category or access class for which a request frame previously requested a buffer report. In some implementations, the values in the TID subfield 450 may indicate the traffic identifier, access category or class for which an included uplink buffer report pertains. Such traffic identifiers may be identified by any value from 0 to 7 and such access categories or classes may be any of: background data, best effort data, video data and voice data.

In certain implementations the most significant bit (e.g., the first bit) of the TID field 450 may be used to signal that certain fields of the QoS Control field 416 are overloaded. As an example, the most significant bit of the TID field 450 (e.g., the first bit) set to 1 indicates that one or more of the following fields contain values that have a different interpretation from when the most significant bit of the TID field 450 is set to 0: one or more of the 3 LSBs of the TID field 450 (e.g., the second through fourth bits), the end of service period field 452, the ACK policy field 454 and the varied field 458. In some implementations, the 3 LSBs of the TID field 450 may include the scaling factor that indicates the requested granularity that an uplink buffer report should use when indicating the amount of buffered uplink data or the requested amount of time to transmit the buffered uplink data. For example, if the first bit of the TID field 450 is a "0," then the second through fourth bits (B1-B3) may include the traffic identifier of the traffic type for which a buffer report was requested and for which an included buffer report pertains. However, if the first bit of the TID field 450 is a "1," (e.g., non-zero) then at least the second and third bits (B1-B2) of the TID field 450 may include the requested scaling factor (e.g., the scaling factor that is used in the included buffer report). In this case, a value 0 (e.g., "00") in the second and third bits of the TID field 450 indicate that a requested amount of time to transmit the data in the uplink buffer is included in the buffer report and that an implicit scaling factor of 8 µs per unit is used in the resulting buffer report. Contrarily, a value of 1 to 3 in the second and third bits of the TID field 450 implicitly indicates that an amount of data in the uplink buffer is included in the buffer report. A value of 1 (e.g., "01") in the second and third bits of the TID field 450 may indicate a scaling factor or granularity of 8 Bytes per unit, providing a value range of 0 to ~32 Kbytes. Similarly, a value of 2 (e.g., "10") in the second and third bits of the TID field 450 may indicate a scaling factor or granularity of 256 Bytes per unit, providing a value range of 0 to ~1 Mbyte. A value of 3 (e.g., "11") in the second and third bits of the TID field 450 may indicate a scaling factor or granularity of 4096 Bytes per unit, providing a value range of 0 to ~16 Mbytes. Where a scaling factor is not present, a default scaling factor may be assumed (e.g., 1). Similarly the remaining fields of the QoS Control field 416 can be interpreted such that the varied field 458 is expanded in length from 8 bits (i.e., from B8 to B15) to a longer length of, e.g., 11 bits (i.e., from B4 to B15). The modified varied field 458 having, e.g., 11 bits, may include an indication of either the requested amount of time to transmit the buffered uplink data or the amount of buffered uplink data, and in the format indicated in the TID field 450. In this way it is possible to signal a wider range of values for the requested amount of time to transmit the buffered uplink data (TXOP Duration Requested) and/or the amount of buffered uplink data (Queue Size). In some implementations, since the Ack policy field 454 is overloaded, in its absence the intended receiver of the frame 900 that contains the QoS Control field 416 may use a predetermined Ack policy value which may be obtained from other parts of the frame 900 or from other frames contained in the PPDU (e.g., as part of an A-MPDU). Although the QoS control field 416 is shown as being located external and adjacent to the HE control field 418, in some implementations, the QoS control field 416 may also or alternatively be located within the HE control field 418. In yet other implementations, the QoS control field may be located in a PHY header of the frame 900 (PHY header not shown in FIG. 9).

Figure 10:
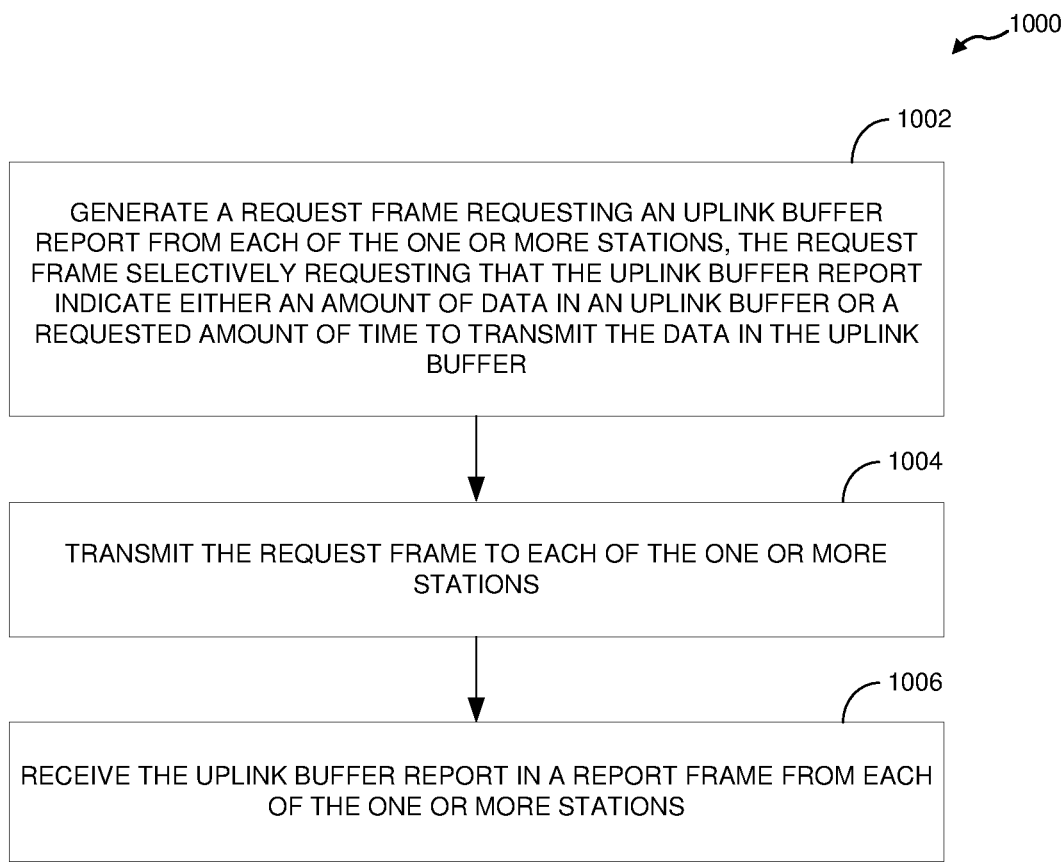
FIG. 10 is a flow chart of an aspect of a method for allocating multi-user communication resources to one or more stations for uplink data transmissions, in accordance with some implementations.

FIG. 10 is a flow chart 1000 of an aspect of a method for allocating multi-user communication resources to one or more stations for uplink data transmissions, in accordance with some implementations. The method depicted by FIG. 10 may correspond to a method carried out by an access point (e.g., the AP 102 of FIG. 1, as may be shown in more detail as the wireless device 202 of FIG. 2), as previously described in connection with FIG. 3A. Accordingly, one or more of the steps in flowchart 1000 may be performed by, or in connection with, the MU-UL module 224 (e.g., one or both of the processor 204 and the memory 206) and/or the transmitter 210 and/or the receiver 212 as previously described in connection with FIG. 2. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1000 may begin with block 1002, which may include generating a request frame requesting an uplink buffer report from each of the one or more stations, the request frame selectively requesting that the uplink buffer report indicate either an amount of data in an uplink buffer or a requested amount of time to transmit the data in the uplink buffer. For example, the wireless device 202 of FIG. 2 (acting as an access point) may generate the trigger frame 304, 314, 354, 364, 370 or CTS-to-self frame 326 (e.g., request frame), as previously described in connection with FIGS. 3A and 3B and as described in more detail in connection with any of FIGS. 4-5. This request frame selectively requests that the uplink buffer report indicate either an amount of data in an uplink buffer or a requested amount of time to transmit the data in the uplink buffer, as previously described in connection with FIGS. 3-5. The flowchart 1000 may then proceed to block 1004.

Block 1004 may comprise transmitting the request frame to each of the one or more stations. For example, the transmitter receiver 210 of the wireless device 202 (FIG. 2) may be configured to transmit the trigger frame 304, 314, 354, 364, 370 or the CTS-to-self frame 326 (e.g., the request frame), as previously described in connection with FIGS. 3A and 3B. The flowchart 1000 may then proceed to block 1006.

Block 1006 may comprise receiving the uplink buffer report in a report frame from each of the one or more stations. For example, the receiver 212 of the wireless device 202 (FIG. 2) may be configured to receive any of the PS poll frames 306, 308, 310, 328, the QoS null frames 322, 378, or HE control frames 356, 358, 360, 372 (e.g., report frames including the uplink buffer report), as described in more detail in connection with any of FIGS. 6-9.

Figure 11:
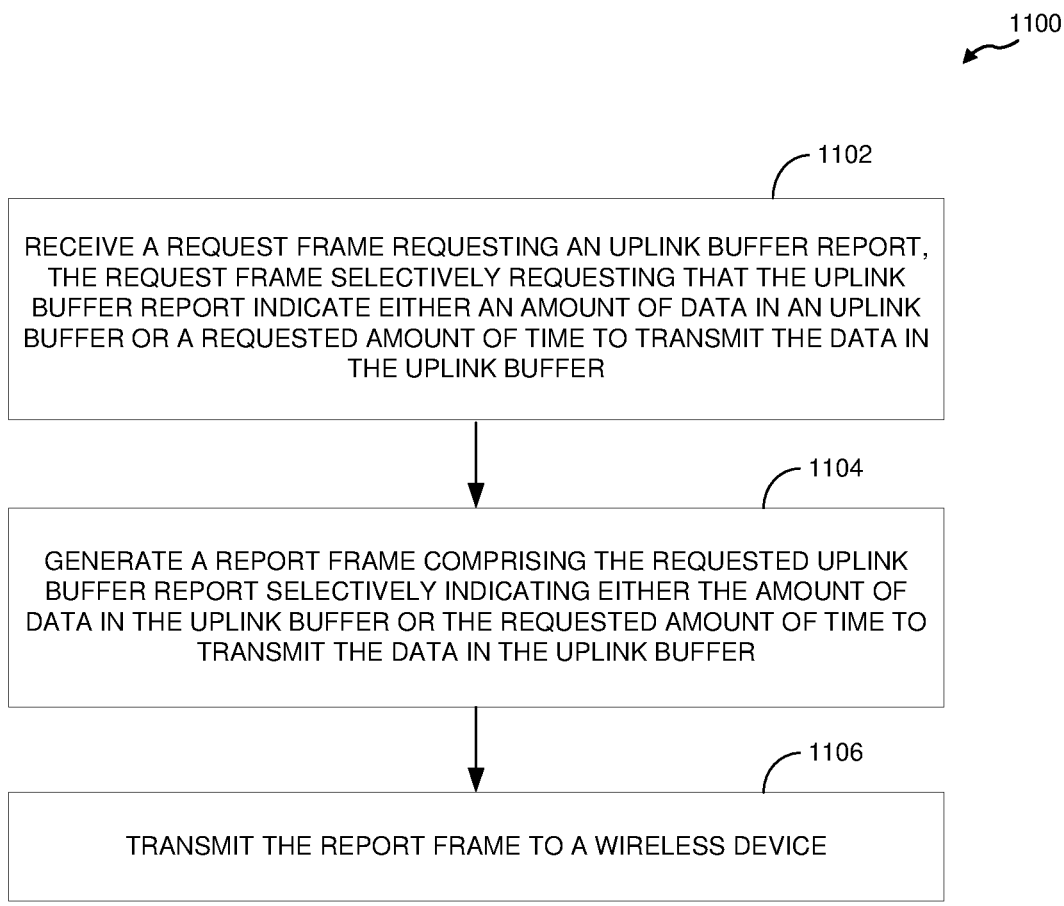
FIG. 11 is a flow chart of an aspect of another method for allocating multi-user communication resources to one or more stations for uplink data transmissions, in accordance with some implementations.

FIG. 11 is a flow chart 1100 of an aspect of another method for allocating multi-user communication resources to one or more stations for uplink data transmissions, in accordance with some implementations. The method depicted by FIG. 11 may correspond to a method carried out by a station (e.g., any of the STAs 104a-104d of FIG. 1, as may be shown in more detail as the wireless device 202 of FIG. 2), as previously described in connection with FIGS. 3A and 3B. Accordingly, one or more of the steps in flowchart 1100 may be performed by, or in connection with, the MU-UL module 224 (e.g., one or both of the processor 204 and the memory 206) and/or the transmitter 210 or receiver 212 as previously described in connection with FIG. 2. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1100 may begin with block 1002, which may include receiving, by a station, a request frame requesting an uplink buffer report, the request frame selectively requesting that the uplink buffer report indicate either an amount of data in an uplink buffer or a requested amount of time to transmit the data in the uplink buffer. For example, the receiver 212 of the wireless device 202 (FIG. 2) may be configured to receive any of the trigger frames 304, 314, 354, 364, 376 and/or the CTS-to-self frame 326 (e.g., request frames), as previously described in connection with FIGS. 3A and 3B. The flowchart 1100 may then proceed to block 1104.

Block 1104 may comprise generating a report frame comprising the requested uplink buffer report selectively indicating either the amount of data in the uplink buffer or the requested amount of time to transmit the data in the uplink buffer. For example, the processor 204 of the MU-UL module 224 of the wireless device 202 (FIG. 2) may be configured to generate a report frame (e.g., any of the PS Poll frames 306, 308, 310, 328, the QoS null frames 322, 378, or HE control frames 356, 358, 360, 372 as previously described in connection with FIGS. 3A and 3B and as described in more detail in connection with any of FIGS. 6-9). The flowchart 1100 may then proceed to block 1106.

Block 1106 may comprise transmitting the report frame to an access point. For example, the transmitter 210 of the wireless device 202 (FIG. 2) may be configured to transmit any of the PS-Poll frames 306, 308, 310, 328, the QoS null frames 322, 378, or the HE control frames 356, 358, 360, 372 (e.g., the report frames) to the AP 102, as previously described in connection with FIGS. 3A and 3B.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for allocating communication resources to one or more stations for data transmissions, comprising:
   generating a request frame requesting a buffer report from each of the one or more stations, the request frame selectively requesting that the buffer report indicates either an amount of data in a buffer or a requested amount of time to transmit the data in the buffer, the request frame further indicating that the buffer report is to use a selected one of four different granularities to indicate either the amount of data in the buffer or the requested amount of time to transmit the data in the buffer, the request frame further indicating a duration for receiving a report frame from the one or more stations, the report frame comprising the buffer report;
   transmitting the request frame to at least one of the one or more stations; and
   receiving the buffer report in a report frame from at least one of the one or more stations based at least in part on the duration and selected granularity.

2. The method of claim 1, wherein the communication resources are allocated to the one or more stations for the data transmissions based on the received buffer report from each of the one or more stations.

3. The method of claim 1, further comprising generating the request frame as one of:
   a trigger frame; and
   a clear to send (CTS)-to-self frame comprising an address of an access point in a transmitter address field and an address of one of the one or more stations in a receiver address field.

4. The method of claim 1, wherein the report frame is one of a quality of service null frame, a quality of service data frame, a power save poll frame, and a control frame.

5. The method of claim 1, further comprising determining a presence of data as indicated in a more data subfield of a frame control field of the report frame.

6. The method of claim 1, further comprising determining the amount of data in the buffer or the requested amount of time to transmit the data in the buffer as indicated in a duration field of the report frame.

7. The method of claim 6, further comprising determining whether the buffer report indicates the amount of data in the buffer or the requested amount of time to transmit the data in the buffer based on an indication provided by at least one bit of the duration field.

8. The method of claim 1, further comprising determining the amount of data in the buffer or the requested amount of time to transmit the data in the buffer as indicated in a quality of service control field of the report frame.

9. The method of claim 8, further comprising determining whether the buffer report indicates the amount of data in the buffer or the requested amount of time to transmit the data in the buffer based on whether transmission parameters are controlled by an access point or by the station generating the report frame.

10. The method of claim 8, further comprising determining a granularity with which the buffer report indicates the amount of data in the buffer or the requested amount of time to transmit the data in the buffer as indicated in the quality of service control field of the report frame.

11. The method of claim 1, further comprising determining a granularity with which the buffer report indicates the amount of data in the buffer or the requested amount of time to transmit the data in the buffer based on a transmission rate of the report frame.

12. A method for allocating communication resources to one or more stations for data transmissions, comprising:
   receiving a request frame requesting a buffer report, the request frame selectively requesting that the buffer report indicate either an amount of data in a buffer or a requested amount of time to transmit the data in the buffer, the request frame further indicating that the buffer report is to use a selected one of four different granularities to indicate either the amount of data in the buffer or the requested amount of time to transmit the data in the buffer, the request frame further indicating a duration for receiving a report frame from the one or more stations;
   generating a report frame comprising the requested buffer report selectively indicating, at a selected granularity, either the amount of data in the buffer or the requested amount of time to transmit the data in the buffer, and transmitting the report frame to a wireless device.

13. The method of claim 12, wherein a message is received from the wireless device allocating a portion of the communication resources to at least one station for data transmissions based on the buffer report from the at least one station.

14. The method of claim 12, wherein the request frame is received from the wireless device as one of:
   a trigger frame; and
   a clear to send (CTS)-to-self frame comprising an address of the wireless device in a transmitter address field and an address of the station in a receiver address field.

15. The method of claim 12, further comprising generating the report frame as one of a quality of service null frame, a quality of service data frame, and a power save poll frame.

16. The method of claim 12, further comprising utilizing a more data subfield in a frame control field of the report frame to indicate a presence of data.

17. The method of claim 12, further comprising utilizing a duration field of the report frame to selectively indicate the amount of data in the buffer or the requested amount of time to transmit the data in the buffer.

18. The method of claim 17, further comprising utilizing at least one bit of the duration field to indicate whether the buffer report indicates the amount of data in the buffer or the requested amount of time to transmit the data in the buffer.

19. The method of claim 12, further comprising utilizing a quality of service control field of the report frame to selectively indicate the amount of data in the buffer or the requested amount of time to transmit the data in the buffer.

20. The method of claim 19, wherein whether the buffer report indicates the amount of data in the buffer or the requested amount of time to transmit the data in the buffer is based on whether transmission parameters are controlled by the wireless device or by the station generating the report frame.

21. The method of claim 19, further comprising indicating, in a quality of service control field of the report frame, a granularity that the buffer report uses to indicate the amount of data in the buffer or the requested amount of time to transmit the data in the buffer.

22. The method of claim 12, wherein the buffer report indicates the amount of data in the buffer or the requested amount of time to transmit the data in the buffer using a granularity that is based on a transmission rate of the report frame.

23. A non-transitory computer-readable medium comprising processor-executable program code configured to cause a processor of an apparatus to:
generate a request frame requesting a buffer report from one or more stations, the request frame selectively requesting that the buffer report indicates either an amount of data in a buffer or a requested amount of time to transmit the data in the buffer, the request frame further indicating that the buffer report is to use a selected one of four different granularities to indicate either the amount of data in the buffer or the requested amount of time to transmit the data in the buffer, the request frame further indicating a duration for receiving a report frame from the one or more stations, the report frame comprising the buffer report;
transmit the request frame to at least one of the one or more stations; and
receive the buffer report in a report frame from at least one of the one or more stations based at least in part on the duration and selected granularity.

24. The non-transitory computer readable medium of claim 23, wherein the communication resources are allocated to the one or more stations for data transmissions based on the received buffer report from each of the one or more stations.

25. The non-transitory computer readable medium of claim 23, wherein the processor of the apparatus is further configured to generate the request frame as one of:
a trigger frame; and
a clear to send (CTS)-to-self frame comprising an address of an access point in a transmitter address field and an address of one of the one or more stations in a receiver address field.

26. The non-transitory computer readable medium of claim 23, wherein the report frame is one of a quality of service null frame, a quality of service data frame, a power save poll frame, and a control frame.

27. The non-transitory computer readable medium of claim 23, wherein the processor of the apparatus is further configured to determine a presence of data as indicated in a more data subfield of a frame control field of the report frame.

28. The non-transitory computer readable medium of claim 23, wherein the processor of the apparatus is further configured to determine the amount of data in the buffer or the requested amount of time to transmit the data in the buffer as indicated in a duration field of the report frame.

29. The non-transitory computer readable medium of claim 28, wherein the processor of the apparatus is further configured to determine whether the buffer report indicates the amount of data in the buffer or the requested amount of time to transmit the data in the buffer based on an indication provided by at least one bit of the duration field.

30. The non-transitory computer readable medium of claim 23, wherein the processor of the apparatus is further configured to determine the amount of data in the buffer or the requested amount of time to transmit the data in the buffer as indicated in a quality of service control field of the report frame.

31. The non-transitory computer readable medium of claim 30, wherein the processor of the apparatus is further configured to determine whether the buffer report indicates the amount of data in the buffer or the requested amount of time to transmit the data in the buffer based on whether transmission parameters are controlled by an access point or by the station generating the report frame.

32. The non-transitory computer readable medium of claim 30, wherein the processor of the apparatus is further configured to determine a granularity with which the buffer report indicates the amount of data in the buffer or the requested amount of time to transmit the data in the buffer as indicated in the quality of service control field of the report frame.

33. The non-transitory computer readable medium of claim 23, wherein the processor of the apparatus is further configured to determine a granularity with which the buffer report indicates the amount of data in the buffer or the requested amount of time to transmit the data in the buffer based on a transmission rate of the report frame.

34. A non-transitory computer-readable medium comprising processor-executable program code configured to cause a processor of an apparatus for allocating communication resources to:
receive a request frame requesting a buffer report, the request frame selectively requesting that the buffer report indicate either an amount of data in a buffer or a requested amount of time to transmit the data in the buffer, the request frame further indicating that the buffer report is to use a selected one of four different granularities to indicate either the amount of data in the buffer or the requested amount of time to transmit the data in the buffer, the request frame further indicating a duration for receiving a report frame from the one or more stations;
generate a report frame comprising the requested buffer report selectively indicating, at a selected granularity, either the amount of data in the buffer or the requested amount of time to transmit the data in the buffer, and
transmit the report frame to a wireless device.

35. The non-transitory computer readable medium of claim 34, wherein a message is received from the wireless device allocating a portion of the communication resources to at least one station for data transmissions based on the buffer report from the at least one station.

36. The non-transitory computer readable medium of claim 34, wherein the request frame is received from the wireless device as one of:
a trigger frame; and
a clear to send (CTS)-to-self frame comprising an address of the wireless device in a transmitter address field and an address of the station in a receiver address field.

37. The non-transitory computer readable medium of claim 34, wherein the processor of the apparatus is further configured to generate the report frame as one of a quality of service null frame, a quality of service data frame, and a power save poll frame.

38. The non-transitory computer readable medium of claim 34, wherein the processor of the apparatus is further configured to utilize a more data subfield in a frame control field of the report frame to indicate a presence of data.

39. The non-transitory computer readable medium of claim 34, wherein the processor of the apparatus is further configured to utilize a duration field of the report frame to selectively indicate the amount of data in the buffer or the requested amount of time to transmit the data in the buffer.

40. The non-transitory computer readable medium of claim 39, wherein the processor of the apparatus is further configured to utilize at least one bit of the duration field to indicate whether the buffer report indicates the amount of data in the buffer or the requested amount of time to transmit the data in the buffer.

41. The non-transitory computer readable medium of claim 34, wherein the processor of the apparatus is further configured to utilize a quality of service control field of the report frame to selectively indicate the amount of data in the buffer or the requested amount of time to transmit the data in the buffer.

42. The non-transitory computer readable medium of claim 41, wherein whether the buffer report indicates the amount of data in the buffer or the requested amount of time to transmit the data in the buffer is based on whether transmission parameters are controlled by the wireless device or by the station generating the report frame.

43. The non-transitory computer readable medium of claim 41, wherein the processor of the apparatus is further configured to indicate, in a quality of service control field of the report frame, a granularity that the buffer report uses to indicate the amount of data in the buffer or the requested amount of time to transmit the data in the buffer.

44. The non-transitory computer readable medium of claim 34, wherein the buffer report indicates the amount of data in the buffer or the requested amount of time to transmit the data in the buffer using a granularity that is based on a transmission rate of the report frame.

* * * * *